US012070774B2

(12) United States Patent
Taki

(10) Patent No.: US 12,070,774 B2
(45) Date of Patent: Aug. 27, 2024

(54) ULTRASONIC DEVICE HAVING SOUND ABSORBING MATERIAL WITH UNEVEN SHAPE

(71) Applicant: TDK CORPORATION, Tokyo (JP)

(72) Inventor: Tatsuya Taki, Tokyo (JP)

(73) Assignee: TDK CORPORATION, Tokyo (JP)

(*) Notice: Subject to any disclaimer, the term of this patent is extended or adjusted under 35 U.S.C. 154(b) by 529 days.

(21) Appl. No.: 17/459,579

(22) Filed: Aug. 27, 2021

(65) Prior Publication Data

US 2022/0062950 A1 Mar. 3, 2022

(30) Foreign Application Priority Data

Aug. 31, 2020 (JP) ................................ 2020-146109

(51) Int. Cl.
*B06B 1/06* (2006.01)
*G10K 11/00* (2006.01)
*G10K 11/162* (2006.01)

(52) U.S. Cl.
CPC .......... *B06B 1/0681* (2013.01); *G10K 11/002* (2013.01); *G10K 11/162* (2013.01)

(58) Field of Classification Search
CPC ... B06B 1/0681; G10K 11/002; G10K 11/162
See application file for complete search history.

(56) References Cited

U.S. PATENT DOCUMENTS 5,172,023 A * 12/1992 Kawai .................... H02N 2/163 310/323.04
5,754,491 A * 5/1998 Cushman ............ G10K 11/165 367/1
2020/0086347 A1* 3/2020 Hirao ...................... B06B 1/064

FOREIGN PATENT DOCUMENTS

JP 2004-260239 A 9/2004

* cited by examiner

*Primary Examiner* — Emily P Pham
(74) *Attorney, Agent, or Firm* — Oliff PLC

(57) ABSTRACT

An ultrasonic device according to one aspect includes a case, a piezoelectric element, a sound absorbing material, and a vibration-proof material. The case defines a housing space. The piezoelectric element is disposed in the housing space. The sound absorbing material is disposed on a main face of the piezoelectric element and is made of a foaming material. The vibration-proof material is disposed around the sound absorbing material. The sound absorbing material includes a first opposing face opposed to the main face. The first opposing face has an uneven shape in which a plurality of protruding portions and a plurality of depression portions are alternately continued, and is rougher than the main face.

20 Claims, 14 Drawing Sheets

ULTRASONIC DEVICE HAVING SOUND ABSORBING MATERIAL WITH UNEVEN SHAPE

TECHNICAL FIELD

The present disclosure relates to an ultrasonic device.

BACKGROUND

A known ultrasonic transceiver includes a housing case, a piezoelectric vibration element disposed in the housing case, a soundproofing filling material, such as felt, disposed on the piezoelectric vibration element, and sealing insulating resin, such as silicon resin, that seals the housing case (see, for example, Japanese Unexamined Patent Publication No. 2004-260239).

SUMMARY

Ultrasonic devices are required to further reduce reverberation of ultrasonic components. However, it is difficult for the known ultrasonic device described above to sufficiently reduce reverberation of ultrasonic components.

A purpose of one aspect of the present disclosure is to provide an ultrasonic device that further reduces reverberation of ultrasonic components.

An ultrasonic device according to one aspect includes a case, a piezoelectric element, a sound absorbing material, and a vibration-proof material. The case defines a housing space. The piezoelectric element is disposed in the housing space. The sound absorbing material is disposed on a main face of the piezoelectric element and is made of a foaming material. The vibration-proof material is disposed around the sound absorbing material. The sound absorbing material includes a first opposing face opposed to the main face. The first opposing face has an uneven shape in which a plurality of protruding portions and a plurality of depression portions are alternately continued, and is rougher than the main face.

In the one aspect, the first opposing face of the sound absorbing material opposed to the piezoelectric element has an uneven shape rougher than the main face of the piezoelectric element. Accordingly, the surface area of the first opposing face is increased, and it is possible to enhance the sound absorbing effect of the sound absorbing material. As a result, it is possible to further reduce reverberation of the ultrasonic components.

In the one aspect, a plurality of depressions may be provided on surfaces of the plurality of protruding portions and the plurality of depression portions of the first opposing face. In this case, since the surface area of the first opposing face is further increased, it is possible to further enhance the sound absorbing effect of the sound absorbing material.

In the one aspect, a first space may be formed between the piezoelectric element and the first opposing face. In this case, reverberation of the ultrasonic components is not directly transmitted from the piezoelectric element to a skeleton of the sound absorbing material. Accordingly, it is possible to further reduce reverberation of the ultrasonic components.

The one aspect may further include a substrate disposed in the housing space in such a way as to oppose to the piezoelectric element via the sound absorbing material and electrically connected to the piezoelectric element. The sound absorbing material may include a second opposing face opposed to the substrate. The second opposing face may have an uneven shape in which a plurality of protruding portions and a plurality of depression portions are alternately continued, and may be rougher than the main face. In this case, the second opposing face has an uneven shape rougher than the main face of the piezoelectric element. Thus, the ultrasonic components are diffusely reflected by the second opposing face. Accordingly, leakage of the ultrasonic components from the second opposing face to the outside is suppressed. As a result, it is possible to further reduce reverberation of the ultrasonic components.

In the one aspect, a plurality of depressions may be provided on surfaces of the plurality of protruding portions and the plurality of depression portions of the second opposing face. In this case, the ultrasonic components are further diffusely reflected by the plurality of depressions.

In the one aspect, a second space may be formed between the substrate and the second opposing face. In this case, reverberation of the ultrasonic components is not directly transmitted from a skeleton of the sound absorbing material to the substrate. Accordingly, it is possible to further reduce reverberation of the ultrasonic components.

In the one aspect, the first opposing face may be rougher than the second opposing face. In this case, since the surface area of the first opposing face is increased as compared with the case of the first opposing face not being rough, it is possible to enhance the sound absorbing effect by the sound absorbing material.

The one aspect may further include a damping material disposed on the main face. The sound absorbing material may be disposed in such a way that the plurality of protruding portions of the first opposing face is in contact with the damping material. In this case, since the first opposing face has the uneven shape, the sound absorbing effect by the sound absorbing material is exerted although the plurality of protruding portions is in contact with the damping material.

In the one aspect, the piezoelectric element may be positioned inside an outer edge of the sound absorbing material when viewed from a thickness direction of the piezoelectric element. In this case, the ultrasonic components are easily absorbed by the sound absorbing material. Accordingly, reverberation of the ultrasonic components is further reduced.

In the one aspect, the sound absorbing material may protrude toward the piezoelectric element from the vibration-proof material in a thickness direction of the piezoelectric element. In this case, the surface area of the sound absorbing material exposed from the vibration-proof material is increased, and reverberation of the ultrasonic component is further reduced.

In the one aspect, the first opposing face may include, when viewed from a thickness direction of the piezoelectric element, a first region positioned outside the piezoelectric element and a second region positioned inside the first region. The second region may be rougher than the first region. In this case, since the surface area is increased by the second region being rough, it is possible to efficiently perform sound wave absorption. In addition, since the first region has a soundproofing effect, it is possible to prevent sound wave transmission to sleeves and pins.

DETAILED DESCRIPTION

Hereinafter, an embodiment of the present disclosure will be described in detail with reference to the accompanying drawings. Note that, the same reference signs are assigned to the same elements or elements having the same function in the description, and the redundant description will be omitted.

Figure 1:
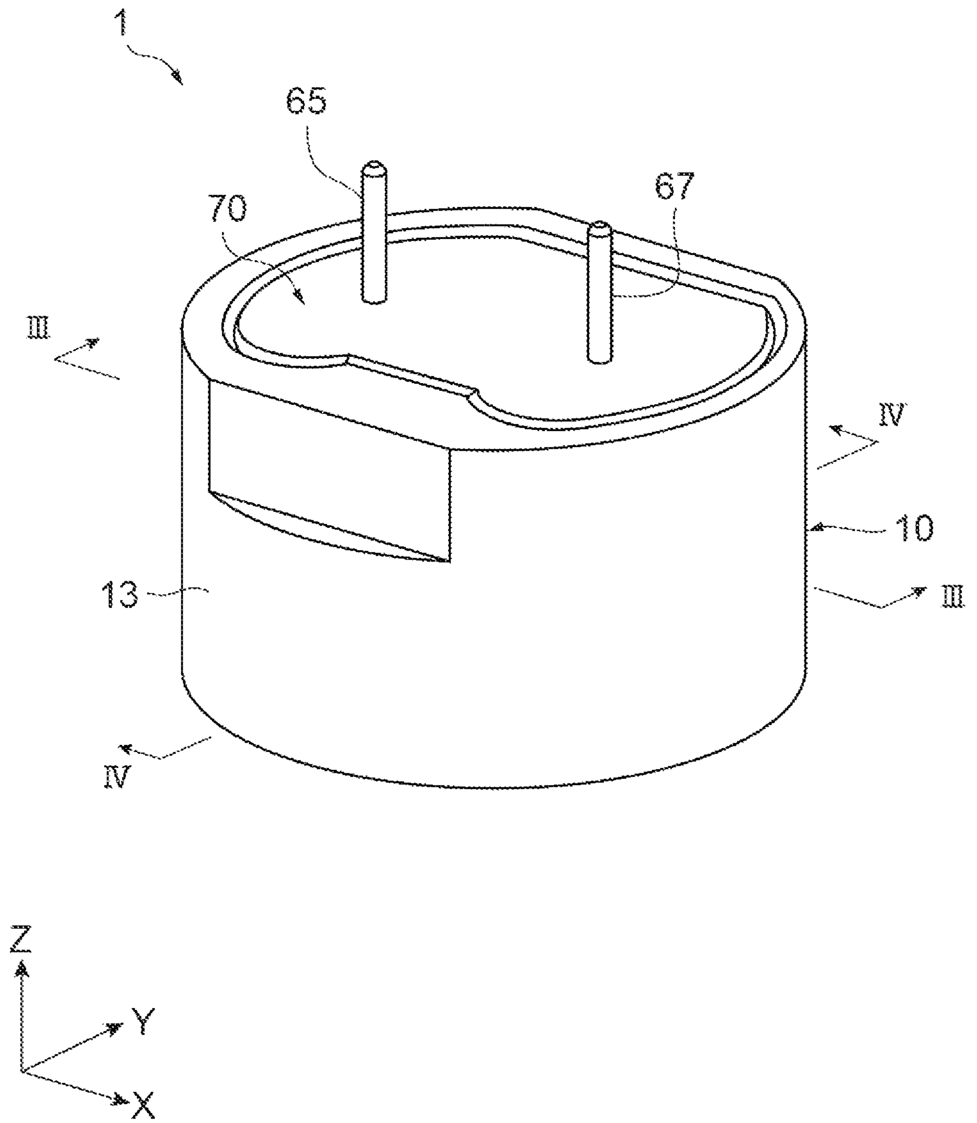
FIG. 1 is a perspective view of an ultrasonic device according to an embodiment.
Figure 2:
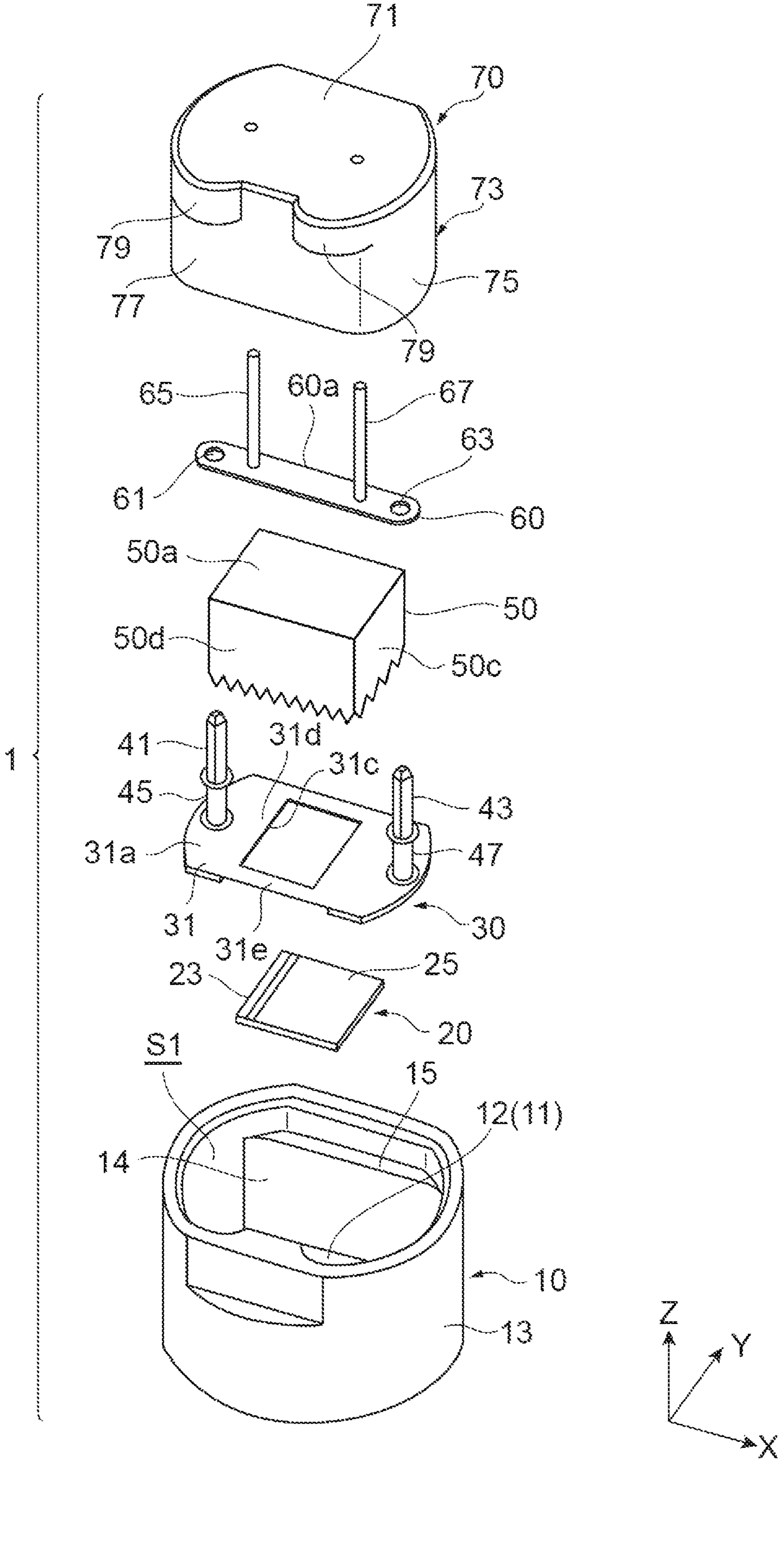
FIG. 2 is an exploded perspective view of the ultrasonic device in FIG. 1.
Figure 3:
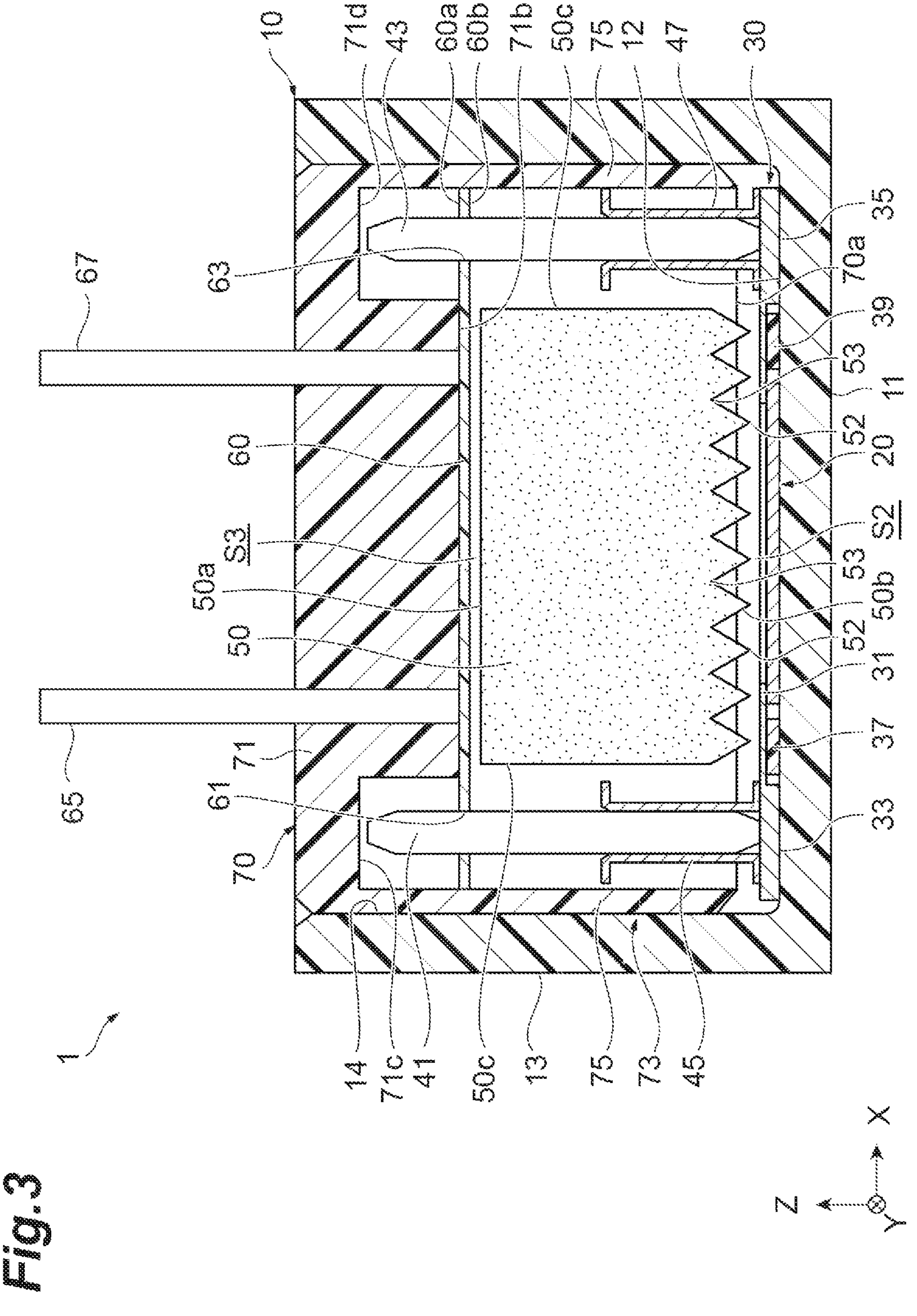
FIG. 3 is a cross-sectional view taken along the line III-III in FIG. 1.
Figure 4:
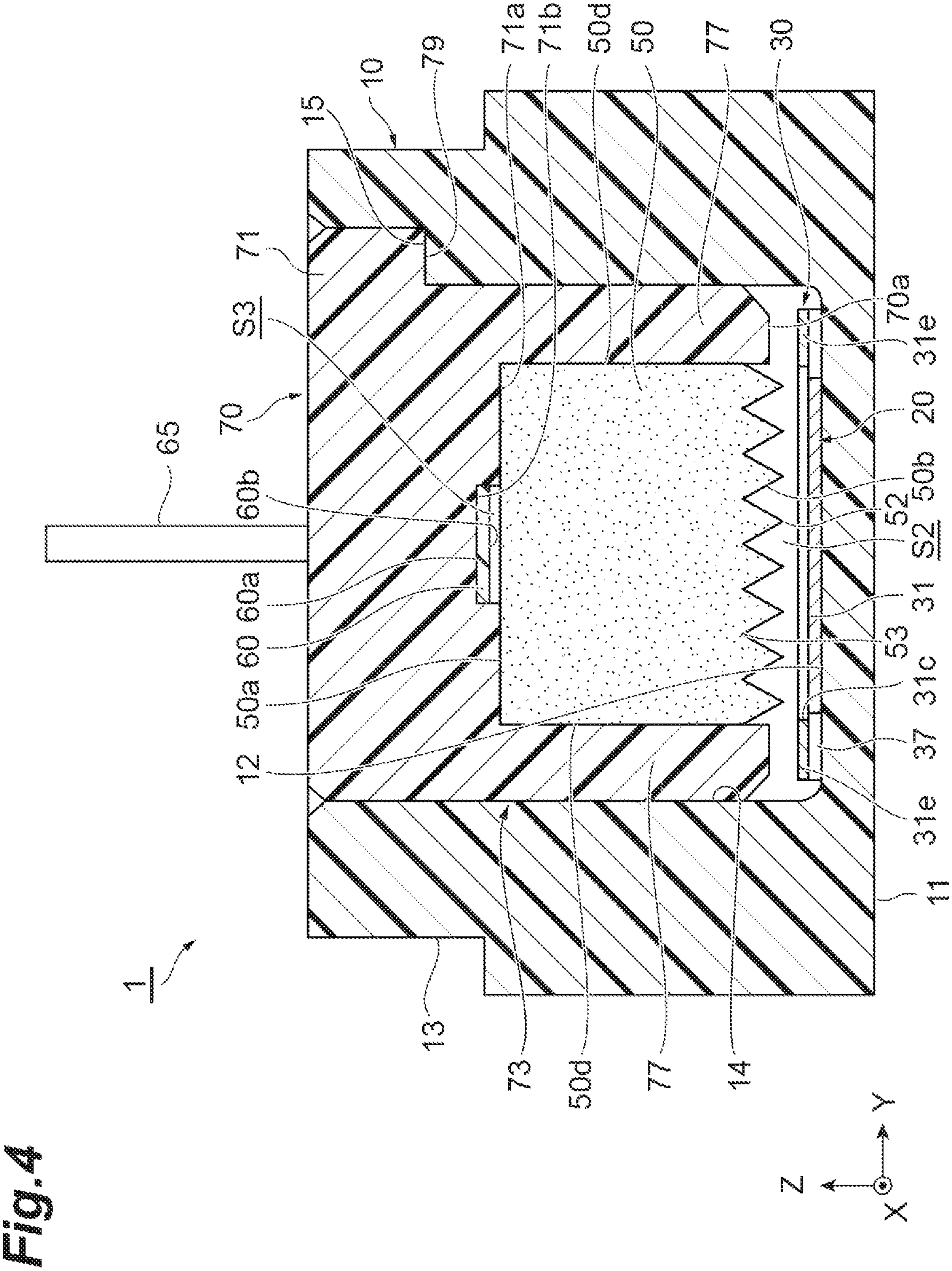
FIG. 4 is a cross-sectional view taken along the line IV-IV in FIG. 1.

A configuration of an ultrasonic device 1 according to the present embodiment will be described with reference to FIGS. 1 to 4. FIG. 1 is a perspective view of an ultrasonic device according to an embodiment. FIG. 2 is an exploded perspective view of the ultrasonic device in FIG. 1. FIG. 3 is a cross-sectional view taken along the line III-III in FIG. 1. FIG. 4 is a cross-sectional view taken along the line IV-IV in FIG. 1.

As shown in FIGS. 1 to 4, the ultrasonic device 1 includes a case 10, a piezoelectric element 20, a wiring member 30, a plurality of pins 41 and 43, a plurality of sleeves 45 and 47, a sound absorbing material 50, a substrate 60, a plurality of pins 65 and 67, and a vibration-proof material 70. The case 10 defines a housing space S1. The piezoelectric element 20, the wiring member 30, the pins 41 and 43, the sound absorbing material 50, the substrate 60, the pins 65 and 67, and the vibration-proof material 70 are disposed in the housing space S1. In the present embodiment, the ultrasonic device 1 constitutes an ultrasonic sensor. The ultrasonic device 1 transmits and receives ultrasonic waves, for example.

The case 10 has a bottom wall 11 and a side wall 13. The side wall 13 extends in a direction intersecting the bottom wall 11. The bottom wall 11 and the side wall 13 define the housing space S1. The direction intersecting the bottom wall 11 may be, for example, a direction orthogonal to the bottom wall 11. The bottom wall 11 and the side wall 13 are integrally formed. The case 10 is a bottomed cylindrical member having one opened end. The case 10 is made of, for example, aluminum (Al). The case 10 may be made of metal other than Al. The case 10 may be made of, for example, an aluminum alloy, stainless steel, or a copper alloy. The aluminum alloy includes, for example, duralumin. The copper alloy includes, for example, brass.

Figure 5:
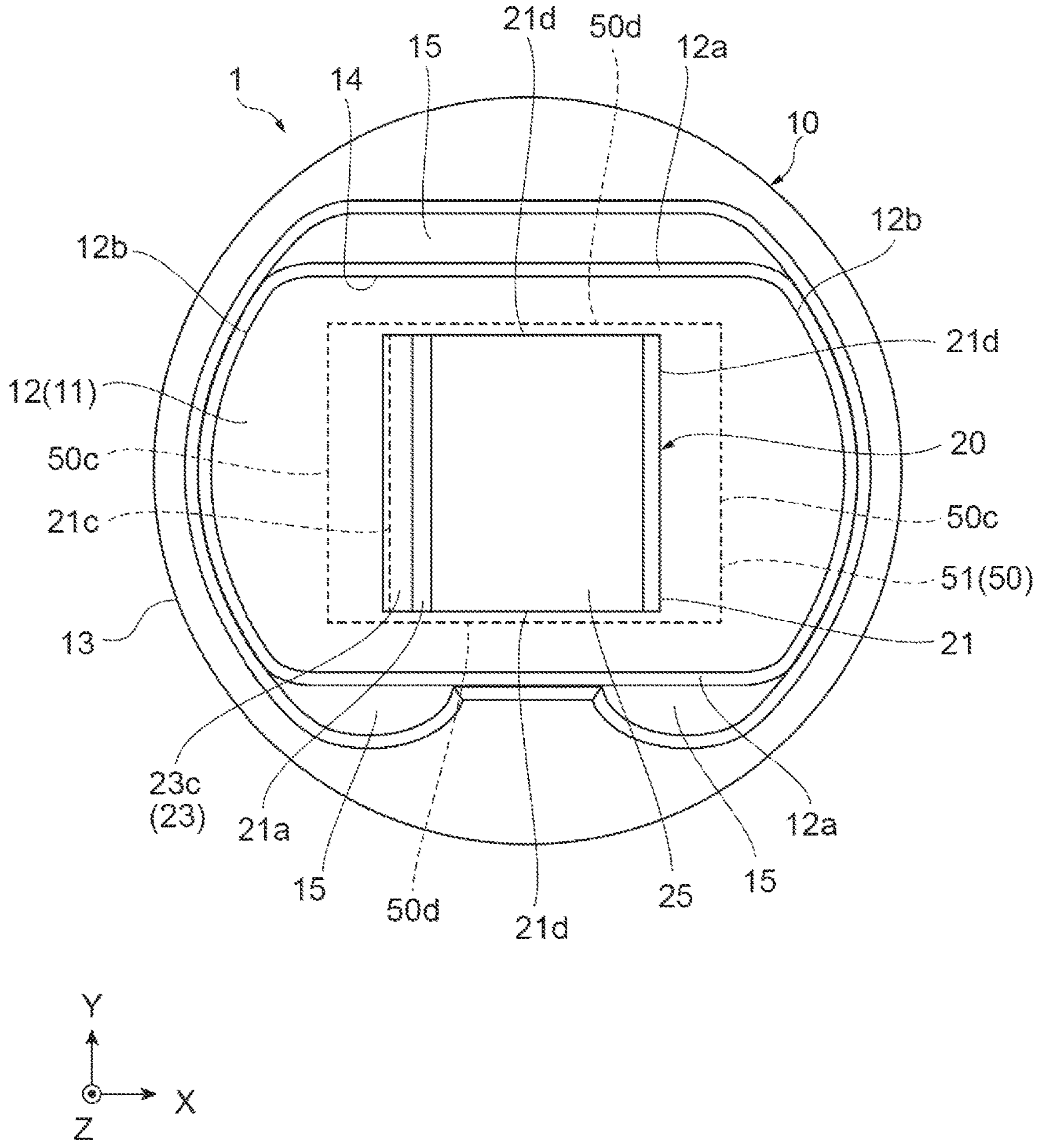
FIG. 5 is a plan view of the case and the piezoelectric element.

FIG. 5 is a plan view of the case and the piezoelectric element. In FIG. 5, the sound absorbing material 50 is shown by a broken line. As also shown in FIG. 5, the bottom wall 11 has a bottom face 12 facing the housing space. The bottom face 12 has a circular shape having a major axis and a minor axis when viewed from a direction intersecting the bottom face 12. In the present embodiment, the bottom face 12 has an oval shape. In the bottom face 12, a direction along the major axis and a direction along the minor axis intersect each other. The direction along the major axis and the direction along the minor axis are, for example, orthogonal to each other. The thickness of the bottom wall 11 is, for example, 0.7 mm or more and 1.5 mm or less. In the present embodiment, the thickness of the bottom wall 11 is 0.9 mm.

In the following, the direction along the major axis of the bottom face 12 is referred to as an X direction, the direction along the minor axis of the bottom face 12 is referred to as a Y direction, and a direction orthogonal to the bottom face 12 is referred to as a Z direction.

The bottom face 12 is defined by a pair of edges 12*a* each having a linear shape and a pair of edges 12*b* each having an arc shape. The two edges 12*a* extend in the X direction and are separated from each other in the Y direction. The two edges 12*a* are substantially parallel to each other. Each edge 12*b* connects the ends of the two edges 12*a*. The circular shape having the major axis and the minor axis may be an elliptical shape. The direction intersecting the bottom face 12 may be, for example, the direction orthogonal to the bottom face 12. The direction intersecting the bottom face 12 may be aligned with the direction intersecting the bottom wall 11.

The side wall 13 has an inner face 14. The bottom face 12 and the inner face 14 constitute an inner face of the case 10. On the inner face 14, a plurality of stepped portions 15 is formed. In the present embodiment, three stepped portions 15 are formed. One stepped portion 15 extends along one edge 12*a*. The remaining two stepped portions 15 are provided along the other edge 12*a* and separated from each other. The stepped portions 15 are used to position the vibration-proof material 70 with respect to the case 10.

Figure 6:
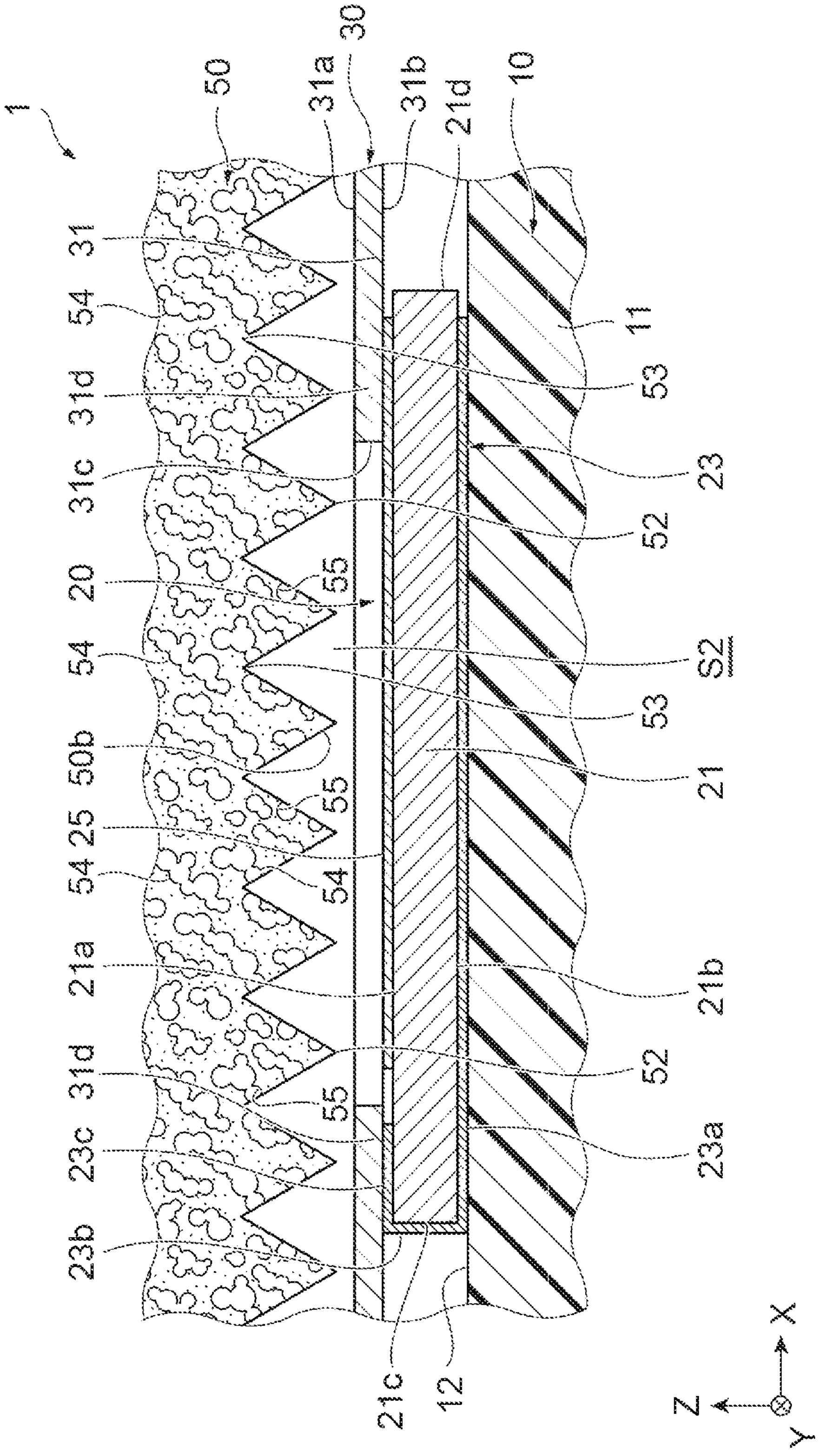
FIG. 6 is a partially enlarged view of FIG. 3.
Figure 7A:
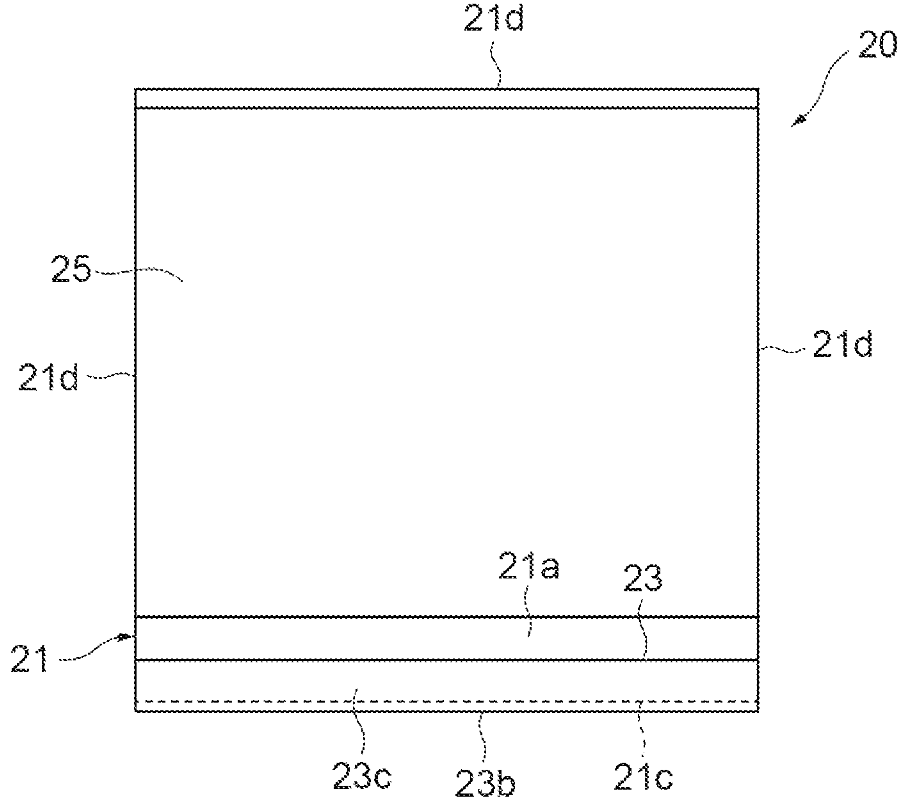
FIGS. 7A and 7B are plan views of the piezoelectric element.
Figure 7B:
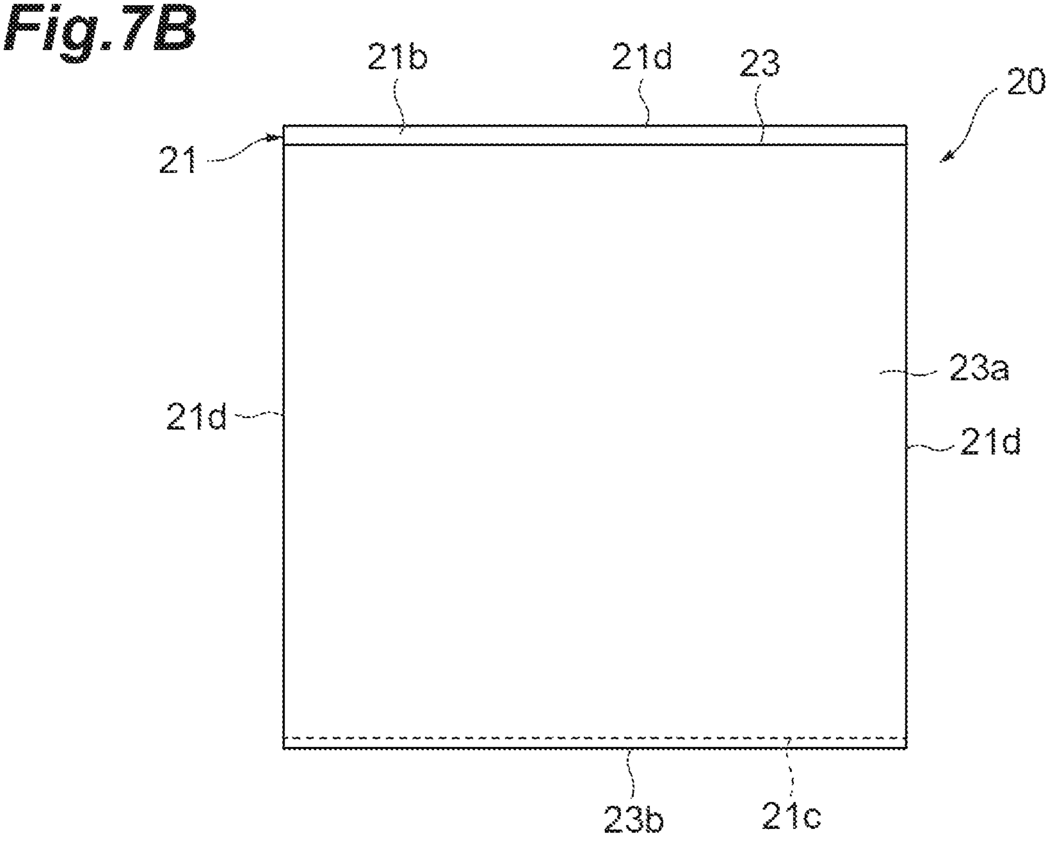

FIG. 6 is a partially enlarged view of FIG. 3. FIGS. 7A and 7B are plan views of the piezoelectric element. As shown in FIGS. 5, 6, 7A, and 7B, the piezoelectric element 20 includes a piezoelectric element body 21 and a plurality of electrodes 23 and 25. In the present embodiment, the piezoelectric element 20 has two electrodes 23 and 25. The piezoelectric element 20 is disposed on the bottom wall 11. The piezoelectric element 20 is fixed to the bottom wall 11 by, for example, bonding.

The piezoelectric element body 21 has a pair of main faces 21*a* and 21*b* opposed to each other, and at least one side face 21*c*. The side face 21*c* extends in a direction in which the two main faces 21*a* and 21*b* are opposed to each other (Z direction) in such a way as to connect the two main faces 21*a* and 21*b*. The main face 21*b* is opposed to the bottom face 12. The piezoelectric element 20 is disposed on the bottom wall 11 in such a way that the main face 21*b* is opposed to the bottom face 12. The direction in which the two main faces 21*a* and 21*b* are opposed to each other is the direction intersecting the bottom wall 11 (bottom face 12). The direction in which the two main faces 21*a* and 21*b* are opposed to each other may be the direction orthogonal to the bottom wall 11 (bottom face 12).

The piezoelectric element body 21 has a rectangular parallelepiped shape (rectangular plate shape). The two main faces 21*a* and 21*b* each has a rectangular shape. The piezoelectric element body 21 has three side faces 21*d* in addition to the side face 21*c*. Each side face 21*d* also extends in the direction in which the two main faces 21*a* and 21*b* are opposed to each other (Z direction) in such a way as to connect the two main faces 21*a* and 21*b*. In the present embodiment, the piezoelectric element body 21 has a square shape in a plan view. The piezoelectric element body 21 may have a disk shape. The rectangular parallelepiped shape in this specification includes a rectangular parallelepiped shape in which the corner portions and the ridge portions are chamfered, and a rectangular parallelepiped shape in which the corner portions and the ridge portions are rounded.

The piezoelectric element body 21 is made of a piezoelectric ceramic material. The piezoelectric ceramic material includes, for example, PZT [$Pb(Zr, Ti)O_3$], PT ($PbTiO_3$), PLZT [$(Pb, La)(Zr, Ti)O_3$], or barium titanate ($BaTiO_3$). The piezoelectric element body 21 is made of, for example, a sintered body of a ceramic green sheet containing the above piezoelectric ceramic material. The thickness of the piezoelectric element body 21 is, for example, 150 μm or more and 500 μm or less. In the present embodiment, the thickness of the piezoelectric element body 21 is 200 μm.

The electrode 23 is provided on the main face 21*b*, the side face 21*c*, and the main face 21*a*. The electrode 23 has a portion 23*a* positioned on the main face 21*b*, a portion 23*b* positioned on the side face 21*c*, and a portion 23*c* positioned on the main face 21*a*. The portion 23*a* and the portion 23*b* are connected to each other at a ridge portion positioned between the main face 21*b* and the side face 21*c*. The portion 23*b* and the portion 23*c* are connected to each other at a ridge portion positioned between the main face 21*a* and the side face 21*c*. The portions 23*a*, 23*b*, and 23*c* are integrally formed. The portion 23*a* of the electrode 23 is joined to the bottom wall 11 (bottom face 12).

When viewed from a thickness direction (Z direction) of the piezoelectric element 20 (piezoelectric element body 21), the portion 23*a* of the electrode 23 is separated from a ridge portion positioned between the side face 21*d* opposed to the side face 21*c* and the main face 21*b*. The main face 21*b* is exposed along the ridge portion positioned between the side face 21*d* opposed to the side face 21*c* and the main face 21*b*. The portion 23*b* of the electrode 23 covers the entire side face 21*c*. Each side face 21*d* is exposed from the electrode 23.

The electrode 25 is provided on the main face 21*a*. The electrode 25 is disposed only on the main face 21*a*. The electrode 25 is separated from the portion 23*c* of the electrode 23. The main face 21*a* is exposed between the portion 23*c* of the electrode 23 and the electrode 25. When viewed from a direction orthogonal to the main face 21*a*, the electrode 25 is separated from a ridge portion positioned between the side face 21*d* opposed to the side face 21*c* and the main face 21*a*. The main face 21*a* is exposed along the ridge portion positioned between the side face 21*d* opposed to the side face 21*c* and the main face 21*a*. Each side face 21*d* is also exposed from the electrode 25. The piezoelectric element body 21 has a region overlapping with the portion 23*a* of the electrode 23 and the electrode 25 in the Z direction. This region is sandwiched between the portion 23*a* of the electrode 23 and the electrode 25 in the Z direction. In the piezoelectric element 20, this region constitutes a piezoelectrically active region.

Each of the electrodes 23 and 25 is in contact with the surface of the piezoelectric element body 21. The thickness of each of the electrodes 23 and 25 is 1.5 μm or less. Each of the electrodes 23 and 25 includes a laminate formed by, for example, a chromium (Cr) layer, a nickel-copper alloy (Ni—Cu) layer, and a gold (Au) layer. Each of the electrodes 23 and 25 may contain silver (Ag), titanium (Ti), platinum (Pt), a silver-palladium alloy (Ag—Pd), or a nickel-chromium alloy (Ni—Cr). Each of the electrodes 23 and 25 is formed on the surface of the piezoelectric element body 21 by, for example, sputtering.

As also shown in FIG. 5, the piezoelectric element 20 is disposed on the bottom wall 11 (bottom face 12) in such a way that the side face 21*c* is along the Y direction. A region of the main face 21*a* exposed from the electrodes 23 and 25 extends in the Y direction. While the piezoelectric element 20 is disposed in the case 10, the electrode 25 and the portion 23*c* of the electrode 23 are separated from each other in the X direction. In the present embodiment, a direction in which the side face 21*c* is opposed to the side face 21*d* is the X direction. For example, the piezoelectric element 20 is disposed substantially at the center of the bottom face 12 in the X direction and the Y direction. The piezoelectric element body 21 has a square shape in a plan view, but the piezoelectric element body 21 may have a rectangular shape in a plan view. In this case, a direction along the long side of the piezoelectric element body 21 is the longitudinal direction, and a direction along the short side of the piezoelectric element body 21 is the lateral direction. The piezoelectric element 20 may be disposed on the bottom wall 11 in such a way that the longitudinal direction of the piezoelectric element body 21 is along the X direction.

The wiring member 30 is disposed on the main face 21*a* of the piezoelectric element 20 (piezoelectric element body 21). The wiring member 30 is electrically connected to the piezoelectric element 20. The wiring member 30 is, for example, a flexible printed circuit (FPC) or a flexible flat cable (FFC). The wiring member 30 has a base 31 and two leg portions 33 and 35.

The base 31 is a plate-like member having substantially the same shape as the bottom face 12 in a plan view. The base 31 is slightly smaller than the bottom face 12 in a plan view and is disposed in such a way as to be separated from the inner face 14. As also shown in FIG. 6, the base 31 has a pair of main faces 31*a* and 31*b* opposed to each other in the Z direction. The wiring member 30 is disposed in the housing space S1 in such a way that the main face 31*b* is opposed to the piezoelectric element body 21.

The base 31 is formed with an opening 31*c* for exposing a part of the piezoelectric element 20. In the present embodiment, the opening 31*c* has a rectangular shape. The opening 31*c* has a pair of linear edge portions 31*d* opposed to each other in the X direction, and a pair of linear edge portions 31*e* opposed to each other in the Y direction. One edge portion 31*d* covers the entire portion 23*c* of the electrode 23. The other edge portion 31*d* covers a part of the electrode 25.

The base 31 is, for example, a resin layer made of resin such as polyimide resin. On the base 31, a plurality of conductor layers (not shown) is disposed. The conductor layers are bonded to the base 31. In the present embodiment, two conductor layers are disposed. One conductor layer connects the electrode 23 and the pin 41. The other conductor layer connects the electrode 25 and the pin 43.

The leg portions 33 and 35 are provided on the main face 31*b* (see FIG. 6) and are in contact with the bottom face 12. The leg portions 33 and 35 are disposed on the respective sides of the piezoelectric element 20 in such a way as to sandwich the piezoelectric element 20 in the X direction when viewed from the direction orthogonal to the bottom face 12 (Z direction). The leg portions 33 and 35 extend in the Y direction along the respective edges 12*b* (see FIG. 5) of the bottom face 12. The leg portion 33 is opposed to the portion 23*b* of the electrode 23 (the side face 21*c*). The leg portion 35 is opposed to the side face 21*d* opposed to the side face 21*c*.

The wiring member 30 is fixed to the bottom wall 11 (bottom face 12) by insulating hot melt resins 37 and 39. The hot melt resin 37 is disposed, on the main face 31*b*, between the leg portion 33 and the portion 23*b*. The hot melt resin 39 is disposed, on the main face 31*b*, between the leg portion 35 and the side face 21*d*. The hot melt resins 37 and 39 are bonded to the main face 31*b* and the bottom face 12.

The pin 41 is solder-connected to the one conductor layer provided on the base 31. The pin 41 may be connected to the one conductor layer by a conductive adhesive. The pin 41 is electrically connected to the electrode 23 through the one conductor layer. The pin 43 is solder-connected to the other conductor layer provided on the base 31. The pin 43 may be connected to the other conductor layer by a conductive adhesive. The pin 43 is electrically connected to the electrode 25 through the other conductor layer.

The pins 41 and 43 are disposed on the main face 31*a* in such a way as to be separated from each other in the X direction. The pins 41 and 43 extend from the main face 31*a* in the Z direction. In the present embodiment, the pins 41 and 43 have the same shape. Each of the pins 41 and 43 is made of, for example, metal. Each of the pins 41 and 43 is made of, for example, brass. The surface of each of the pins 41 and 43 may be formed with a plating layer (not shown). The plating layer may be formed by, for example, nickel plating and tin plating. In this case, the plating layer has a two-layer structure.

The pin 41 is held by the sleeve 45. The pin 43 is held by the sleeve 47. Each of the sleeves 45 and 47 is a cylindrical member having flanges at both ends. In the present embodiment, the sleeves 45 and 47 have the same shape. Each of the sleeves 45 and 47 is made of resin. Each of the sleeves 45 and 47 is made of, for example, metal such as phosphorus-deoxidized copper (PDC) or brass. When the sleeves 45 and 47 are made of metal, the sleeves 45 and 47 in addition to the pins 41 and 43 can be joined to the conductor layers of the wiring member 30, which increases the connection reliability. Each of the sleeves 45 and 47 may be made of polyether ether ketone (PEEK) resin, polybutylene terephthalate (PBT) resin, or polyphenylene sulfide (PPS) resin.

The flange on one end side of each of the sleeves 45 and 47 is joined to the main face 31*a*. The sleeve 45 is disposed at a position overlapping the leg portion 33 as viewed from the axial direction (Z direction). The sleeve 47 is disposed at a position overlapping the leg portion 35 as viewed from the axial direction (Z direction). The length of each of the sleeves 45 and 47 in the axial direction is shorter than the length of each of the pins 41 and 43 in the axial direction. The pins 41 and 43 protrude from the respective sleeves 45 and 47.

The sound absorbing material 50 is disposed on the main face 21*a* of the piezoelectric element 20 (piezoelectric element body 21). The sound absorbing material 50 is disposed between the pins 41 and 43 in such a way as to be separated from the pins 41 and 43. The sound absorbing material 50 is disposed in the housing space S1. The sound absorbing material 50 has, for example, a rectangular parallelepiped shape. The sound absorbing material 50 has a pair of main faces 50*a* and 50*b* opposed to each other in the Z direction, a pair of side faces 50*c* opposed to each other in the X direction, and a pair of side faces 50*d* opposed to each other in the Y direction.

The main face 50*a* (the second opposing face) is opposed to the substrate 60. The main face 50*b* (the first opposing face) is opposed to the main face 21*a* of the piezoelectric element 20 (piezoelectric element body 21). In the present embodiment, each of the main faces 50*a* and 50*b* has a rectangular shape having a pair of long sides and a pair of short sides. The long sides of the main faces 50*a* and 50*b* extend in the X direction. The short sides of the main faces 50*a* and 50*b* extend in the Y direction. The side faces 50*c* are opposed to the respective pins 41 and 43. The side faces 50*c* are separated from the respective pins 41 and 43. Both end portions of each side face 50*c* in the Y direction are in contact with the vibration-proof material 70. The side faces 50*d* are in contact with the vibration-proof material 70.

As also shown in FIG. 5, the sound absorbing material 50 overlaps the entire piezoelectric element 20 when viewed from the thickness direction of the piezoelectric element 20 (Z direction). That is, the piezoelectric element 20 is positioned inside an outer edge 51 of the sound absorbing material 50 when viewed from the Z direction. The piezoelectric element 20 is positioned substantially at the center of the sound absorbing material 50 in the X direction and the Y direction when viewed from the Z direction.

The main face 50*b* has an uneven shape in which a plurality of protruding portions 52 and a plurality of depression portions 53 are alternately continued. The main face 50*b* is rougher than the main face 21*a*. The entire main face 50*b* has the uneven shape. The height of each protruding portion 52 (also referred to as the depth of each depression portion 53) is, for example, 0.5 mm or more and 2 mm or less. Specifically, the height of each protruding portion 52 is the height from the bottom of each depression portion 53 to the top of each protruding portion 52. The cycle (pitch) of the uneven shape is, for example, 0.5 mm or more and 1 mm or less. Specifically, the cycle of the uneven shape is a distance between adjacent protruding portions 52 or a distance between adjacent depression portions 53. The cycle of the uneven shape is, for example, the average value of the distances between adjacent protruding portions 52 or the distances between adjacent depression portions 53. The uneven shape of the main face 50*b* is formed by, for example, molding. In the present embodiment, the main face 50*a*, the pair of side faces 50*c*, and the pair of side faces 50*d* of the sound absorbing material 50 do not have an uneven shape like the main face 50*b*.

The sound absorbing material 50 is separated from the piezoelectric element 20. The sound absorbing material 50 is also separated from the wiring member 30. A distance between each protruding portion 52 of the sound absorbing material 50 and the piezoelectric element 20 in the Z direction is, for example, 0.5 mm or more and 2 mm or less. Between the piezoelectric element 20 and the main face 50*b* of the sound absorbing material 50, a space S2 is formed. The space S2 is a part of the housing space S1. The space S2 includes a space in each depression portion 53. The thickness of the space S2 is, for example, the maximum value of a distance between the piezoelectric element 20 and the main face 50*b* in the Z direction. The thickness of the space S2 is, for example, a distance between the piezoelectric element 20 and the bottom of each depression portion 53. The thickness of the space S2 is, for example, 1 mm or more and 4 mm or less. The sound absorbing material 50 may be disposed in such a way that the protruding portions 52 are in contact with the piezoelectric element 20. Even in this case, since the main face 50*b* has the uneven shape, the space S2 is formed between the piezoelectric element 20 and the sound absorbing material 50 (main face 50*b*) as a space in each depression portion 53.

The sound absorbing material 50 is made of, for example, a foaming material (cell structure) mainly containing thermoplastic resin. The thermoplastic resin includes, for example, ethylene-propylene-diene monomer (EPDM). As shown in FIG. 6, the sound absorbing material 50 is made of a foaming material containing open cells 54. In the open cells 54, cells are continuous. In the open cells 54, cells are connected to each other and are three-dimensionally continuous. The open cells 54 are not only continuous in the cross section shown in FIG. 6 but also continuous in a direction intersecting the cross section. The sound absorbing material 50 may include closed cells in addition to the open cells 54.

On the surfaces of the protruding portions 52 and the depression portions 53, a plurality of depressions 55 corresponding to the shapes of the open cells 54 is provided. The depressions 55 are formed of the inner faces of the open cells 54 exposed on the surfaces of the protruding portions 52 and the depression portions 53. The depressions 55 may include depressions connected to the open cells 54 inside the sound absorbing material 50. The depressions 55 may include depressions corresponding to the shapes of the closed cells.

In the present embodiment, the depressions 55 are provided on the entire surface of the sound absorbing material 50. That is, the main face 50*a*, the pair of side faces 50*c*, and the pair of side faces 50*d* are also provided with the depressions 55. The depth of each depression 55 is shallower than the depth of each depression portion 53. The depth of each depression 55 is, for example, 0.1 mm or more and 0.5 mm or less. The cycle (pitch) of the depressions 55 is smaller than the cycle (pitch) of the uneven shape formed of the protruding portions 52 and the depression portions 53. The cycle of the depressions 55 is, for example, a distance between adjacent depressions 55. The cycle of each depression 55 is, for example, the average value of distances between adjacent depressions 55.

The cross-sectional shape of the main face 50*b* is formed by combining a small roughness curve due to the depressions 55 and a large roughness curve due to the uneven shape formed of the protruding portions 52 and the depression portions 53. That is, when the cross-sectional curve of the main face 50*b* is separated by a cycle (wavelength) or a frequency, two roughness curves are obtained. The large roughness curve due to the uneven shape formed of the protruding portions 52 and the depression portions 53 corresponds to a waviness curve.

Figure 8A:
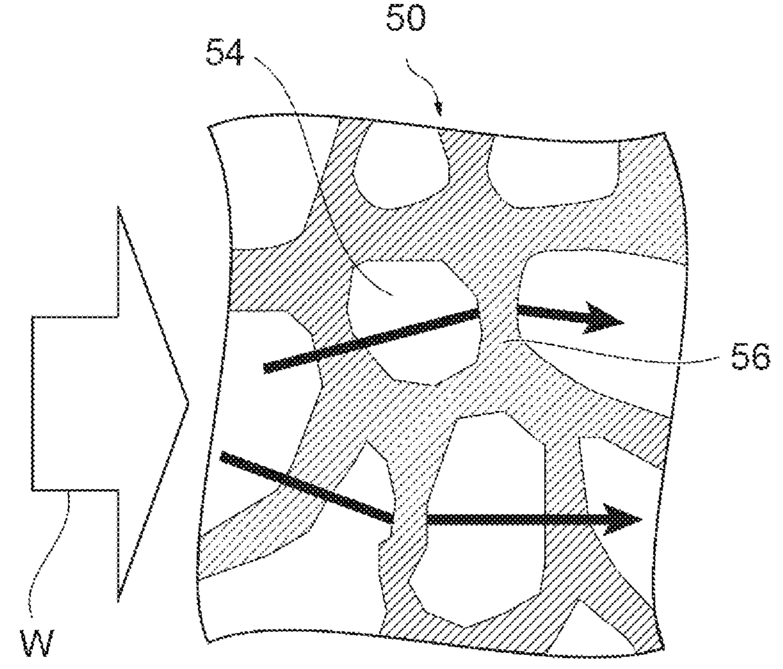
FIGS. 8A and 8B are schematic diagrams showing energy attenuation by sound by a sound absorbing material.
Figure 8B:
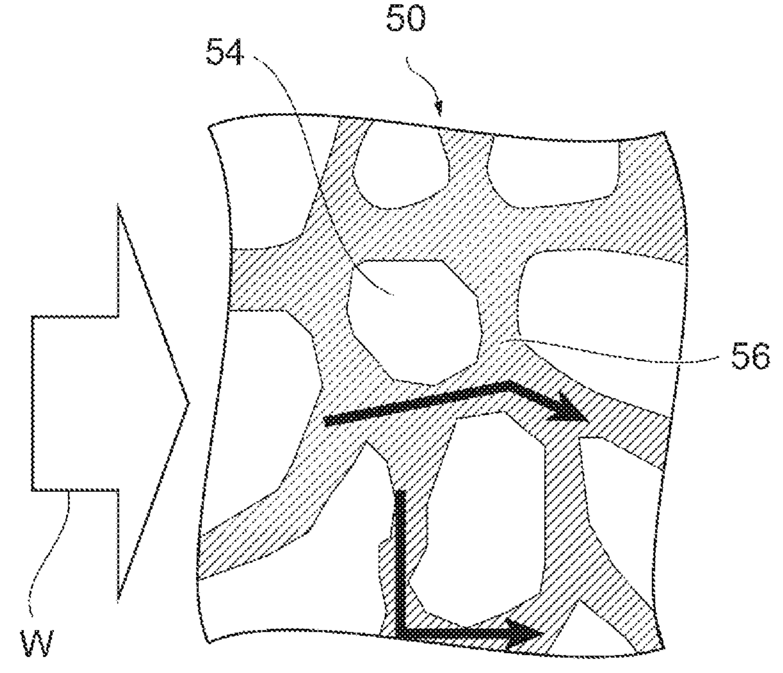

FIGS. 8A and 8B are schematic diagrams showing energy attenuation of sound by a sound absorbing material. Energy attenuation of sound by the sound absorbing material 50 includes energy attenuation of airborne sound and energy attenuation of solid propagation sound. FIG. 8A schematically shows energy attenuation of airborne sound. As shown in FIG. 8A, when a sound wave W passes through the open cells 54 or the closed cells of the sound absorbing material 50, the energy of the sound wave W is attenuated by friction (or viscosity) of the air.

FIG. 8B schematically shows energy attenuation of solid propagation sound. As shown in FIG. 8B, when the sound wave W propagates through a skeleton 56 of the sound absorbing material 50, the energy of the sound wave W is attenuated by the skeleton 56. The energy attenuation of air propagation sound is greater than the energy attenuation of solid propagation sound. In the open cells 54, since the air passage is longer than that in the closed cells, the energy of the air propagation sound is effectively attenuated. The open cells 54 shown in FIGS. 8A and 8B are continuous in a direction intersecting the cross sections shown in FIGS. 8A and 8B.

The substrate 60 is disposed in such a way as to be opposed to the piezoelectric element 20, sandwiching the sound absorbing material 50 therebetween. The substrate 60 is disposed on the main face 50*a*. The substrate 60 is disposed in the housing space S1. The substrate 60 is a plate-like member. The substrate 60 has a pair of main faces 60*a* and 60*b* opposed to each other in the Z direction. The main face 60*b* is opposed to the main face 50*a*.

The substrate 60 is separated from the sound absorbing material 50. Between the substrate 60 (main face 60*b*) and the sound absorbing material 50 (main face 50*a*), a space S3 is formed. The space S3 is a part of the housing space S1. The space S3 is defined by the substrate 60, the sound absorbing material 50, and the vibration-proof material 70. The thickness of the space S3 is, for example, the maximum value of a distance between the substrate 60 (main face 60*b*) and the main face 50*a* in the Z direction. The thickness of the space S3 is thinner than the thickness of the space S2. The thickness of the space S3 is, for example, 0.2 mm or more and 0.45 mm or less. That is, the substrate 60 and the sound absorbing material 50 are separated from each other by 0.2 mm or more and 0.45 mm or less in the Z direction. Note that, the space S3 may not be formed.

Each of the main faces 60*a* and 60*b* has an oval shape. The major axis direction of each of the main faces 60*a* and 60*b* is along the X direction. The minor axis direction of each of the main faces 60*a* and 60*b* is along the Y direction. A pair of edges of each of the main faces 60*a* and 60*b* in the major axis direction is curved in such a way as to bulge outward and has an arc shape. The substrate 60 is provided with insertion holes 61 and 63 through which the pins 41 and 43 are inserted. The insertion holes 61 and 63 are formed at the respective ends of the substrate 60 in the X direction and each has a circular shape. The two edges of each of the main faces 60*a* and 60*b* in the major axis direction are curved along the respective insertion holes 61 and 63.

The substrate 60 is electrically connected to the piezoelectric element 20. The substrate 60 is made of, for example, a glass epoxy substrate. On the substrate 60, a plurality of conductor layers (not shown) is disposed. The conductor layers are bonded to the substrate 60. In the present embodiment, two conductor layers are disposed. One conductor layer connects the pin 41 and the pin 65. The other conductor layer connects the pin 43 and the pin 67.

The pins 41 and 65 are solder-connected to the one conductor layer of the substrate 60. The pins 41 and 65 may be connected to the one conductor layer of the substrate 60 by a conductive adhesive. The pins 41 and 65 are electrically connected to each other through the one conductor layer of the substrate 60. The pins 43 and 67 are solder-connected to the other conductor layer of the substrate 60. The pins 43 and 67 may be connected to the other conductor layer of the substrate 60 by a conductive adhesive. The pins 43 and 67 are electrically connected to each other through the other conductor layer of the substrate 60.

The pins 65 and 67 are disposed on the main face 60*a* in such a way as to be separated from each other in the X direction. The pins 65 and 67 extend from the main face 60*a* in the Z direction and pass through the vibration-proof material 70. The pins 65 and 67 are disposed between the pins 41 and 43 in the X direction. In the present embodiment, the pins 65 and 67 have the same shape.

The pins 65 and 67 are made of, for example, metal. The pins 65 and 67 are made of, for example, brass. The surface of each of the pins 65 and 67 may be formed with a plating layer (not shown). The plating layer may be formed by, for example, nickel plating and tin plating. In this case, the plating layer has a two-layer structure.

The vibration-proof material 70 is disposed in contact with the inner face (inner face 14) of the case 10 to suppress vibration of the case 10. The vibration-proof material 70 is disposed around the sound absorbing material 50. The vibration-proof material 70 has a surface 70*a* opposed to the bottom wall 11 of the case 10. The surface 70*a* is adjacent to the main face 50*b* when viewed from the thickness direction of the piezoelectric element 20 (Z direction).

The vibration-proof material 70 has a lid body 71 and a frame body 73. The lid body 71 seals the opening of the case 10 while the piezoelectric element 20, the wiring member 30, the pins 41 and 43, the sleeves 45 and 47, the sound absorbing material 50, and the substrate 60 are housed in the case 10. The lid body 71 seals the housing space S1. The tip ends of the pins 65 and 67 protrude from the lid body 71.

As shown in FIG. 4, an inner face 71*a* of the lid body 71 is provided with a recess 71*b* in which the substrate 60 is disposed. The substrate 60 is to be disposed in the recess 71*b* while the main face 60*a* is opposed to a bottom face of the recess 71*b*. The bottom face of the recess 71*b* has a shape matching the main face 60*a*. The bottom face of the recess 71*b* has the same shape as the main face 60*a*. To assemble the ultrasonic device 1, for example, the substrate 60 is disposed on the bottom face of the recess 71*b*, and then the sound absorbing material 50 is disposed on the inner face 71*a*. Since the depth of the recess 71*c* is deeper than the thickness of the substrate 60, the space S3 is formed between the substrate 60 and the sound absorbing material 50.

The bottom face of the recess 71*b* is provided with a recess 71*c* in which the pin 41 is to be housed, and a recess 71*d* in which the pin 43 is to be housed. The recesses 71*c* and 71*d* each have, for example, a circular cross section. The diameter of each of the recesses 71*c* and 71*d* is longer than the diameter of each of the pins 41 and 43. The inner faces of the recesses 71*c* and 71*d* are separated from the respective pins 41 and 43. The recesses 71*c* and 71*d* are provided at the respective ends of the bottom face of the recess 71*b* in the X direction.

The frame body 73 extends in a direction intersecting the lid body 71. The direction intersecting the lid body 71 may be, for example, a direction orthogonal to the lid body 71. The lid body 71 and the frame body 73 are integrally formed. The vibration-proof material 70 is a cylindrical member having one closed end and the other opened end (corresponding to the surface 70*a*) in the axial direction. The vibration-proof material 70 is fitted in the case 10. The vibration-proof material 70 is press-fitted into the case 10. The frame body 73 extends from the lid body 71 to the inside of the case 10 along the Z direction. The frame body 73 is separated from the bottom face 12. The frame body 73 is in contact with the inner face 14 of the case 10.

The frame body 73 surrounds the sound absorbing material 50. The sound absorbing material 50 protrudes toward the piezoelectric element 20 from the vibration-proof material 70 (frame body 73) in the thickness direction of the piezoelectric element 20 (Z direction). The distance between the frame body 73 and the piezoelectric element 20 in the Z direction is longer than the distance between the sound absorbing material 50 and the piezoelectric element 20 in the Z direction (the thickness of the space S2).

The frame body 73 has a pair of side portions 75 and a pair of side portions 77. The two side portions 75 are opposed to each other in the X direction, sandwiching the sound absorbing material 50 therebetween. The two side portions 77 are opposed to each other in the Y direction, sandwiching the sound absorbing material 50 therebetween. The two side portions 75 are opposed to the respective side faces 50*c* of the sound absorbing material 50. The two side portions 75 are separated from the sound absorbing material 50.

The two side portions 77 sandwich and hold the sound absorbing material 50. Between the two side portions 77, the sound absorbing material 50 is fitted. The two side portions 77 compress the sound absorbing material 50. The sound absorbing material 50 presses the two side portions 77 with the repulsive force against the compression. The two side portions 77 are in contact with the respective side faces 50*d* of the sound absorbing material 50.

The vibration-proof material 70 further has a plurality of overhanging portions 79 overhangs from the lid body 71 toward the inner face 14. The overhanging portions 79 are provided, in the lid body 71, at positions corresponding to the stepped portions 15 of the case 10. The overhanging portions 79 are disposed on the corresponding stepped portions 15. The vibration-proof material 70 is positioned with respect to the case 10 by engaging the overhanging portions 79 with the stepped portions 15.

The vibration-proof material 70 is an elastic body and suppresses reverberation by elasticity. The vibration-proof material 70 is made of resin. The vibration-proof material 70 is a non-foaming material and has a density higher than the density of the sound absorbing material 50. The vibration-proof material 70 is made of, for example, silicone rubber. The vibration-proof material 70 is made of, for example, room temperature vulcanizing (RTV) silicone rubber.

The ultrasonic sensor transmits an output wave and receives the output wave having bounced back from an inspection object. When the ultrasonic sensor is close to an inspection object and the distance from the ultrasonic sensor to the inspection object is short, the voltage of the reverberation component generated when an output wave is transmitted and the reception voltage of the output wave having bounced back from the inspection object interfere with each other. This can make it difficult for the ultrasonic sensor to detect the reception voltage.

In the ultrasonic device 1, the main face 50*b* of the sound absorbing material 50 opposed to the piezoelectric element 20 has an uneven shape rougher than that of the main face 21*a*. Accordingly, the surface area of the main face 50*b* is increased. The ultrasonic components are absorbed by the sound absorbing material 50 from the main face 50*b*. At this time, as the surface area of the main face 50*b* is increased, the ultrasonic components are more easily absorbed. Thus, with the ultrasonic device 1, it is possible to enhance the sound absorbing effect of the sound absorbing material 50. As a result, it is possible to further reduce reverberation of the ultrasonic components.

In the ultrasonic device 1, a plurality of depressions 55 corresponding to the shapes of the open cells 54 is provided on the surfaces of the protruding portions 52 and the depression portions 53 of the main face 50*b*. Accordingly, since the surface area of the main face 50*b* is further increased, it is possible to further enhance the sound absorbing effect of the sound absorbing material 50.

In the ultrasonic device 1, the space S2 is formed between the piezoelectric element 20 and the sound absorbing material 50. Thus, reverberation of the ultrasonic components is not directly transmitted from the piezoelectric element 20 to the skeleton 56 of the sound absorbing material 50. Accordingly, it is possible to further reduce reverberation of the ultrasonic components.

As described above, the energy of the sound wave W is also attenuated by the skeleton 56, but the energy attenuation of the solid propagation sound is smaller than the energy attenuation of the air propagation sound. Thus, reverberation of the ultrasonic components is more easily reduced when the piezoelectric element 20 and the sound absorbing material 50 are separated from each other than when the piezoelectric element 20 and the sound absorbing material 50 are brought into contact with each other.

When the piezoelectric element 20 and the sound absorbing material 50 are brought into contact with each other, the piezoelectric element 20 is excessively constrained, and as a result, the vibration characteristics of the piezoelectric element 20 can be deteriorated. In the present embodiment, since the piezoelectric element 20 and the sound absorbing material 50 are separated from each other, the piezoelectric element 20 is not excessively constrained as described above. Thus, it is possible to obtain good vibration characteristics. Note that, the protruding portions 52 may be in contact with the piezoelectric element 20 in the ultrasonic device 1. Since the main face 50*b* has the uneven shape, although the protruding portions 52 are in contact with the piezoelectric element 20, the depression portions 53 and the depressions 55 of the main face 50*b* are kept in such a way as not to be in contact with the piezoelectric element 20. Thus, the sound absorbing effect of the sound absorbing material 50 is exerted. In this manner, it is possible to narrow the distance between the piezoelectric element 20 and the sound absorbing material 50 while securing the space S2 between the piezoelectric element 20 and the sound absorbing material 50, and to achieve space-saving.

In the ultrasonic device 1, the space S3 is formed between the substrate 60 and the sound absorbing material 50. Thus, reverberation of the ultrasonic components is not directly transmitted from the skeleton 56 of the sound absorbing material 50 to the substrate 60. Accordingly, it is possible to further reduce reverberation of the ultrasonic components.

In the ultrasonic device 1, the main face 50*b* is rougher than the main face 50*a*. Thus, since the surface area of the main face 50*b* is increased as compared with the case where the main face 50*b* is not rough, it is possible to enhance the sound absorbing effect of the sound absorbing material 50.

In the ultrasonic device 1, the piezoelectric element 20 is positioned inside the outer edge 51 of the sound absorbing material 50 when viewed from the thickness direction of the piezoelectric element 20 (Z direction). In this manner, since the sound absorbing material 50 is disposed in such a way as to cover the entire piezoelectric element 20, the ultrasonic components are easily absorbed by the sound absorbing material 50. Accordingly, reverberation of the ultrasonic components is further reduced.

In the ultrasonic device 1, the sound absorbing material 50 protrudes toward the piezoelectric element 20 from the vibration-proof material 70 in the thickness direction of the piezoelectric element 20 (Z direction). Thus, the surface area of the sound absorbing material 50 exposed from the vibration-proof material 70 is increased, and it is possible to enhance the sound absorbing effect by the sound absorbing material 50. As a result, it is possible to further reduce reverberation of the ultrasonic components.

The embodiment of the present disclosure has been described above; the present invention is not necessarily limited to the above described embodiment, and can be variously changed without departing from the gist.

Figure 9:
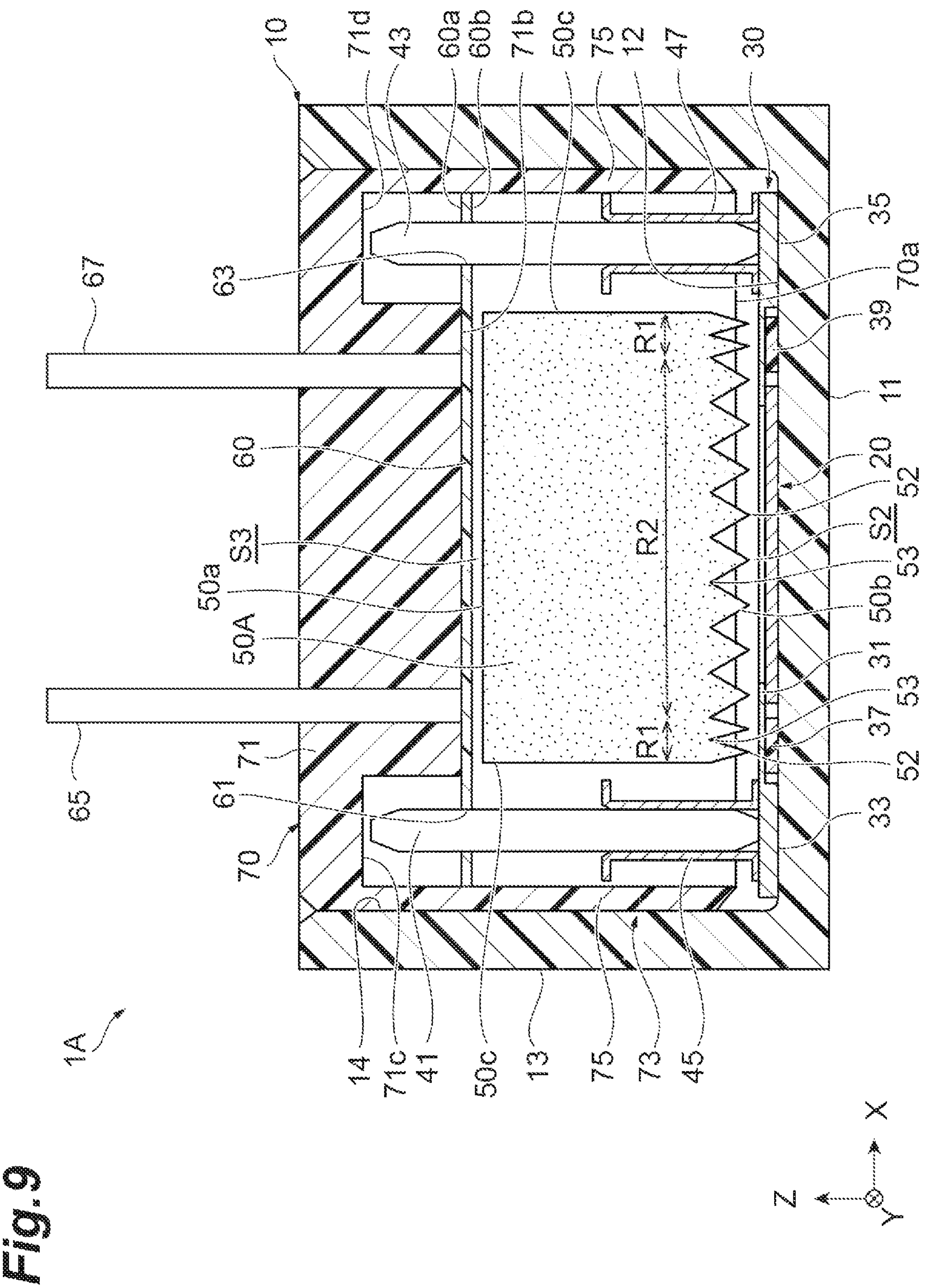
FIG. 9 is a partially enlarged cross-sectional view of an ultrasonic device according to a first modification.

FIG. 9 is a cross-sectional view of an ultrasonic device according to a first modification. As shown in FIG. 9, an ultrasonic device 1A is different from the ultrasonic device 1 (see FIG. 3) in that a sound absorbing material 50A is included instead of the sound absorbing material 50 (see FIG. 3). In the sound absorbing material 50A, when viewed from the thickness direction of the piezoelectric element 20 (Z direction), the main face 50*b* has a first region R1 positioned outside the piezoelectric element 20 and a second region R2 positioned inside the first region R1. When viewed from the Z direction, the second region R2 has the same size as or a larger size than the piezoelectric element 20 and overlaps the entire piezoelectric element 20.

The first region R1 is rougher than the second region R2. Here, the heights of the protruding portions 52 (or the depths of the depression portions 53) are equal to each other in the first region R1 and the second region R2. The cycle (pitch) of the uneven shape in the first region R1 is smaller than the cycle (pitch) of the uneven shape in the second region R2. The number of the protruding portions 52 (or the number of the depression portions 53) in the first region R1 per unit area when viewed from the opposing direction of the main faces 50*a* and 50*b* (Z direction) is larger than the number of the protruding portions 52 (or the number of the depression portions 53) in the second region R2 per unit area.

Figure 10:
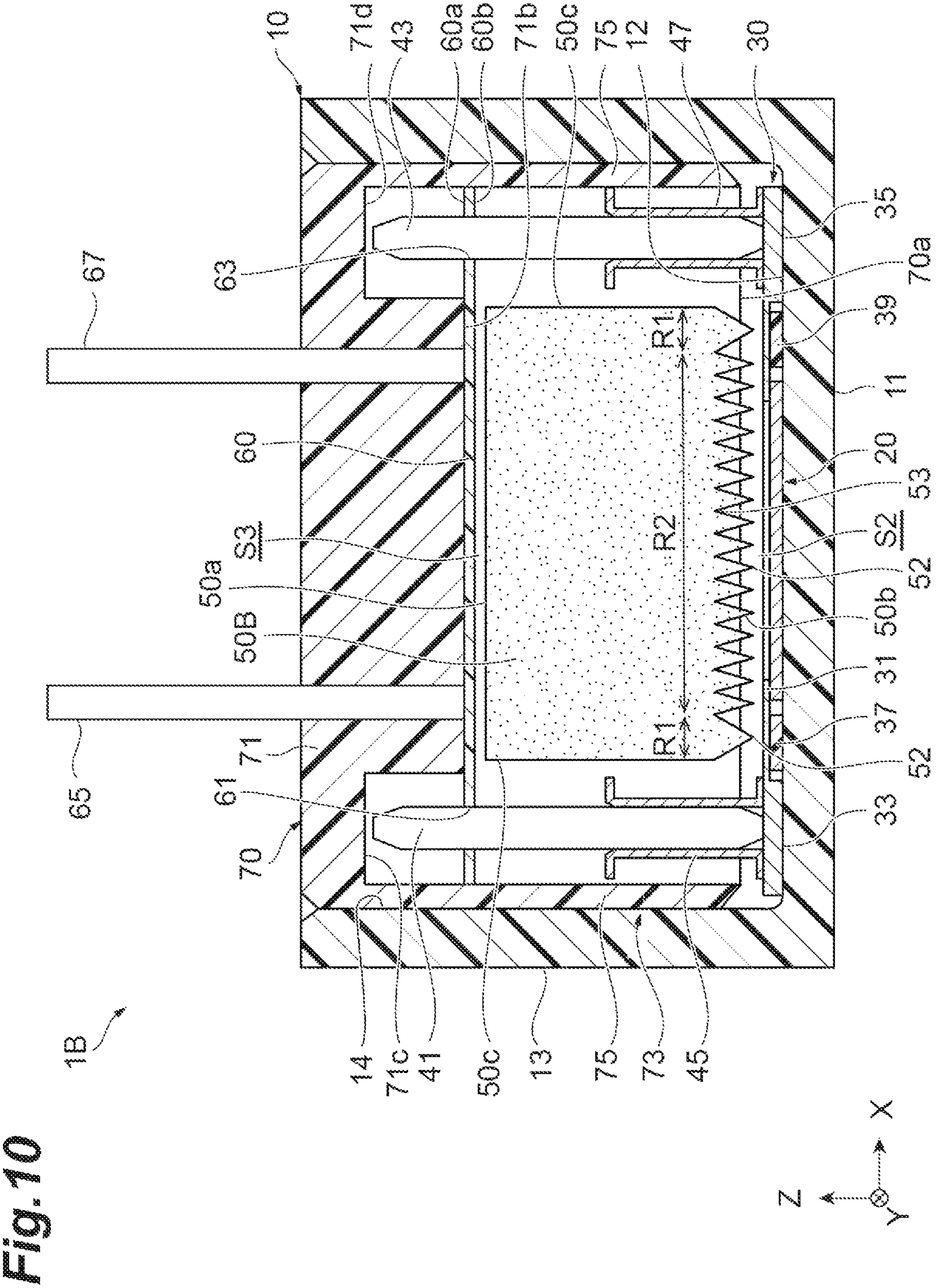
FIG. 10 is a partially enlarged cross-sectional view of an ultrasonic device according to a second modification.

FIG. 10 is a cross-sectional view of an ultrasonic device according to a second modification. As shown in FIG. 10, an ultrasonic device 1B is different from the ultrasonic device 1 (see FIG. 3) in that a sound absorbing material 50B is included instead of the sound absorbing material 50 (see FIG. 3). In the sound absorbing material 50B, when viewed from the thickness direction of the piezoelectric element 20 (Z direction), the main face 50*b* has a first region R1 positioned outside the piezoelectric element 20 and a second region R2 positioned inside the first region R1. When viewed from the Z direction, the second region R2 has the same size as or a larger size than the piezoelectric element 20 and overlaps the entire piezoelectric element 20.

The second region R2 is rougher than the first region R1. Here, the heights of the protruding portions 52 (or the depths of the depression portions 53) are equal to each other in the first region R1 and the second region R2. The cycle (pitch) of the uneven shape in the second region R2 is smaller than the cycle (pitch) of the uneven shape in the first region R1. The number of the protruding portions 52 (or the number of the depression portions 53) in the first region R1 per unit area when viewed from the opposing direction of the main faces 50*a* and 50*b* (Z direction) is smaller than the number of the protruding portions 52 (or the number of the depression portions 53) in the second region R2 per unit area.

Also in each of the ultrasonic devices 1A and 1B, the main face 50*b* has the uneven shape in which the protruding portions 52 and the depression portions 53 are alternately continued, and is rougher than the main face 21*a*. Thus, an effect equal to that of the ultrasonic device 1 can be obtained. In the ultrasonic device 1A, the first region R1 is rougher than the second region R2. Thus, the first region R1 more easily absorbs the ultrasonic components than the second region R2 does. In the ultrasonic device 1B, the second region R2 is rougher than the first region R1. Thus, the second region R2 more easily absorbs the ultrasonic components than the first region R1 does.

A part of the ultrasonic components absorbed by the sound absorbing material 50 is reflected by the inner face of the vibration-proof material 70 and leaks from the main face 50*b* to the outside of the sound absorbing material 50. At this time, as the main face 50*b* is rougher, the ultrasonic components are more diffusely reflected by the main face 50*b* and hardly leak to the outside of the sound absorbing material 50. In the ultrasonic device 1A, since the second region R2 is rougher than the first region R1, leakage of the ultrasonic components from the second region R2 is further suppressed. In the ultrasonic device 1B, since the first region R1 is rougher than the second region R2, leakage of the ultrasonic components from the first region R1 is further suppressed.

In the ultrasonic device 1A, if the sound absorbing material 50 is in contact with the piezoelectric element 20, the contact area is small, and the load on the piezoelectric element 20 is small. In addition, since the surface area is increased by the first region R1 being rough, it is possible to efficiently perform sound wave absorption. In the ultrasonic device 1B, since the surface area is increased by the second region R2 being rough, it is possible to efficiently perform sound wave absorption. In addition, since the first region R1 has a soundproofing effect, it is possible to prevent sound wave transmission to the sleeves 45 and 47 and the pins 41 and 43.

Figure 11:
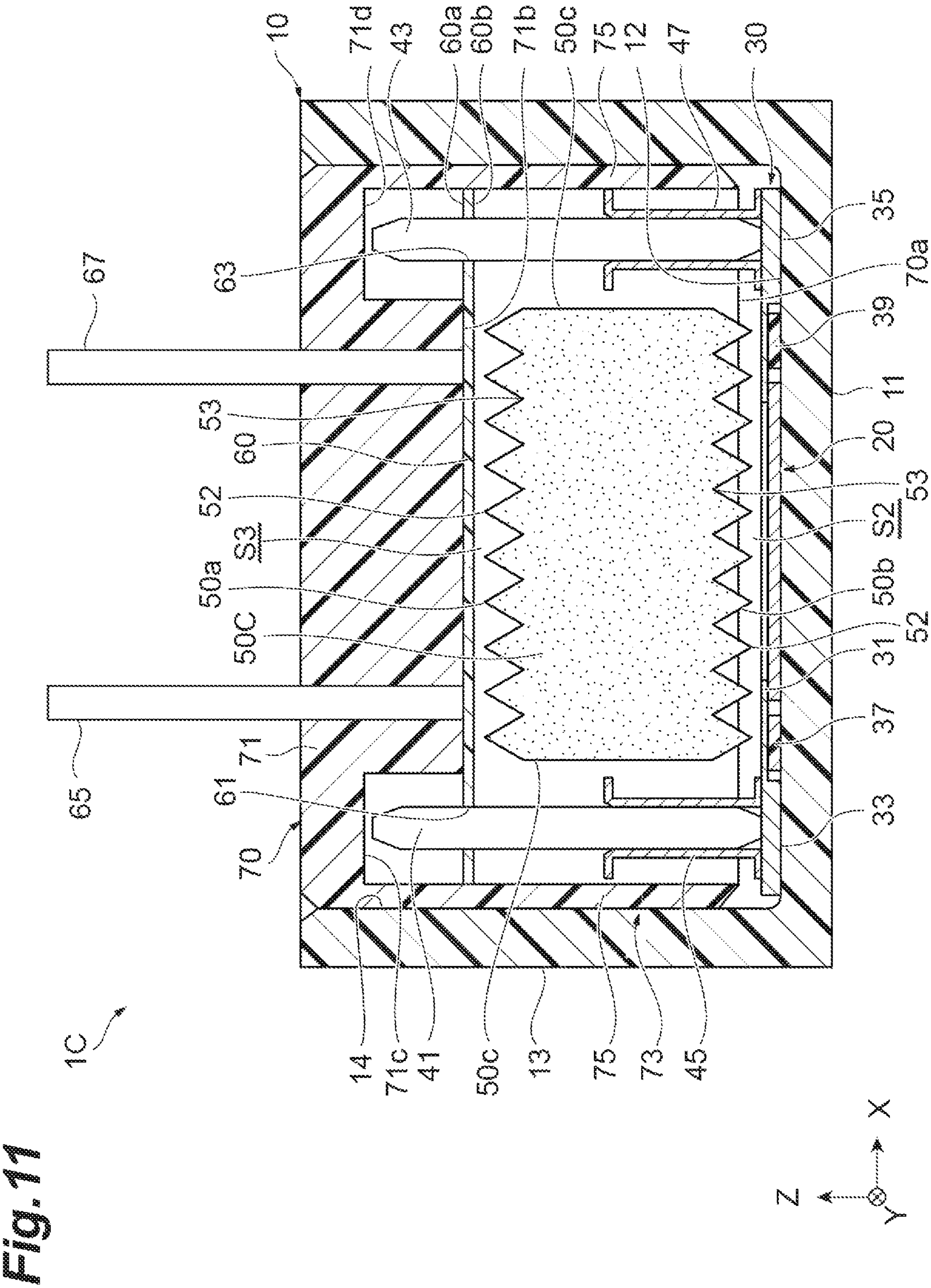
FIG. 11 is a partially enlarged cross-sectional view of an ultrasonic device according to a third modification.

FIG. 11 is a cross-sectional view of an ultrasonic device according to a third modification. As shown in FIG. 11, an ultrasonic device 1C is different from the ultrasonic device 1 (see FIG. 3) in that a sound absorbing material 50C is included instead of the sound absorbing material 50 (see FIG. 3). In the sound absorbing material 50C, the main face 50*a*, in addition to the main face 50*b*, has an uneven shape in which the protruding portions 52 and the depression portions 53 are continuous, and is rougher than the main face 21*a*. The entire main face 50*a* has the uneven shape. Although not shown, in the sound absorbing material 50C, a plurality of depressions 55 corresponding to the shapes of the open cells 54 is also provided on the surfaces of the protruding portions 52 and the depression portions 53 of the main face 50*a*.

The uneven shape of the main face 50*a* is equal to the uneven shape of the main face 50*b*. That is, the height of each protruding portion 52 and the cycle (pitch) of the uneven shape of the main face 50*a* are equal to the height of each protruding portion 52 and the cycle (pitch) of the uneven shape of the main face 50*b*. The number of the protruding portions 52 (or the number of the depression portions 53) per unit area when viewed from the opposing direction of the main faces 50*a* and 50*b* (Z direction) is equal in the main faces 50*a* and 50*b*.

The substrate 60 is separated from the sound absorbing material 50C. A distance between each protruding portion 52 of the main face 50*a* and the substrate 60 in the Z direction is, for example, 0.5 mm or more and 2 mm or less. The space S3 includes a space in each depression portion 53. The sound absorbing material 50C may be disposed in such a way that the protruding portions 52 are in contact with the substrate 60. Even in this case, since the main face 50*a* has the uneven shape, the space S3 is formed between the substrate 60 (main face 60*b*) and the sound absorbing material 50 (main face 50*a*) as a space in each depression portion 53.

Figure 12:
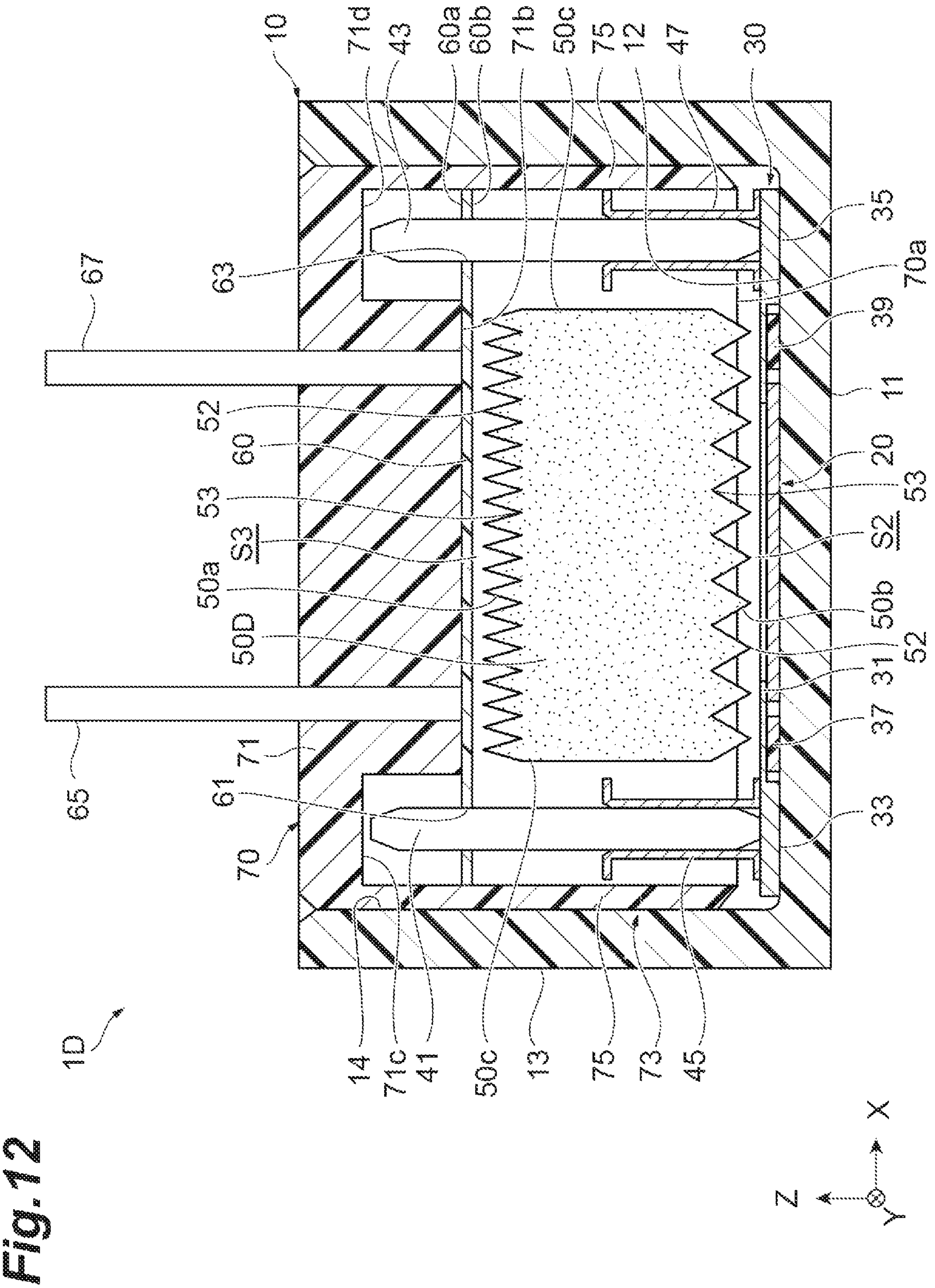
FIG. 12 is a partially enlarged cross-sectional view of an ultrasonic device according to a fourth modification.

FIG. 12 is a cross-sectional view of an ultrasonic device according to a fourth modification. As shown in FIG. 12, an ultrasonic device 1D is different from the ultrasonic device 1C (see FIG. 11) in that a sound absorbing material 50D is included instead of the sound absorbing material 50C (see FIG. 11). In the sound absorbing material 50D, the main face 50*a* is rougher than the main face 50*b*. The uneven shape of the main face 50*a* is different from the uneven shape of the main face 50*b*. The heights of the protruding portions 52 of the main face 50*a* are equal to each other on the main face 50*a* and the main face 50*b*. The cycle (pitch) of the uneven shape of the main face 50*a* is smaller than the cycle (pitch) of the uneven shape of the main face 50*b*. The number of the protruding portions 52 (or the number of the depression portions 53) of the main face 50*a* per unit area when viewed from the opposing direction of the main faces 50*a* and 50*b* (Z direction) is larger than the number of the protruding portions 52 (or the number of the depression portions 53) of the main face 50*b* per unit area.

Figure 13:
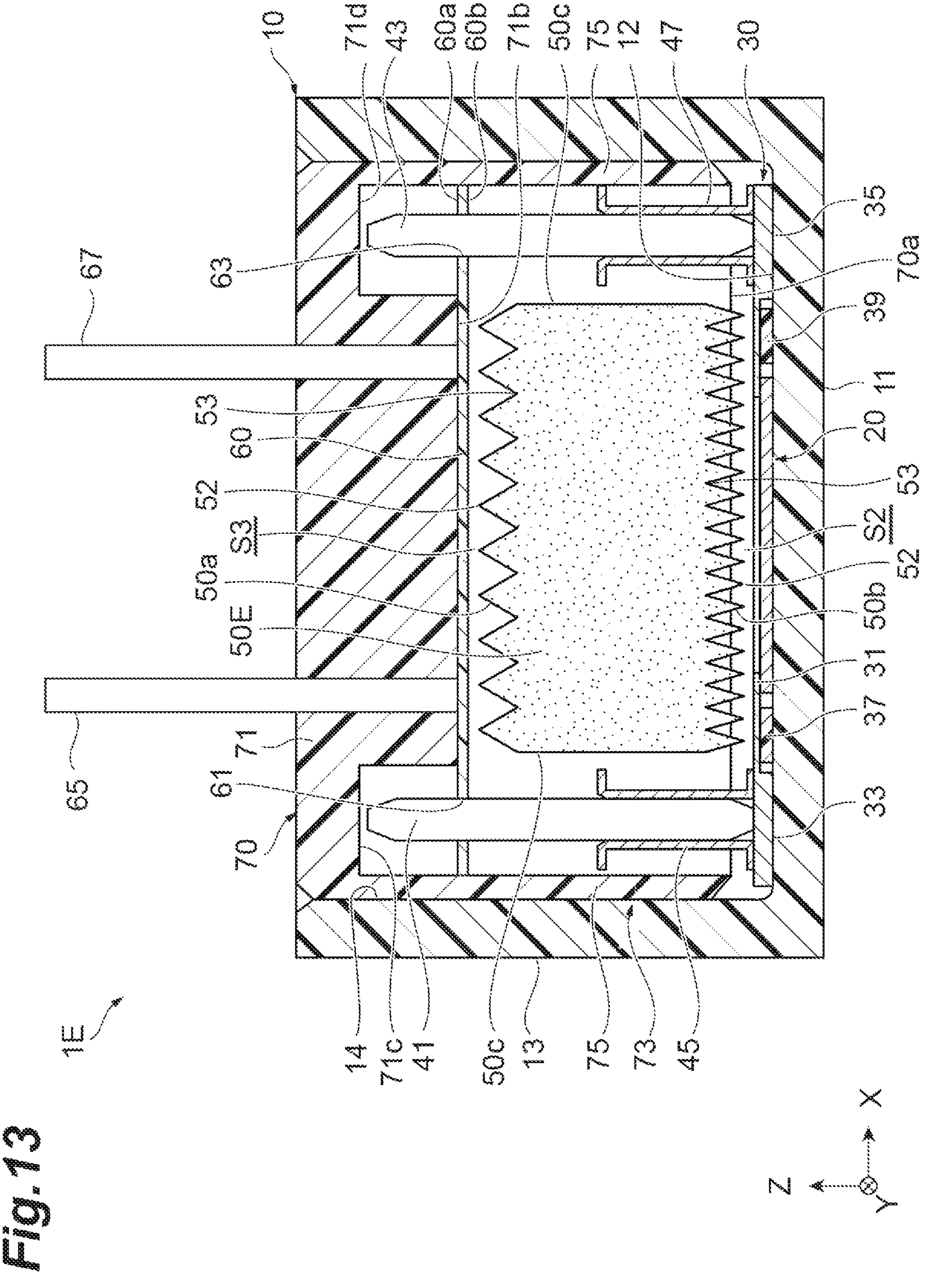
FIG. 13 is a partially enlarged cross-sectional view of an ultrasonic device according to a fifth modification.

FIG. 13 is a cross-sectional view of an ultrasonic device according to a fifth modification. As shown in FIG. 13, an ultrasonic device 1E is different from the ultrasonic device 1C (see FIG. 11) in that a sound absorbing material 50E is included instead of the sound absorbing material 50C (see FIG. 11). In the sound absorbing material 50E, the main face 50*b* is rougher than the main face 50*a*. The uneven shape of the main face 50*a* is different from the uneven shape of the main face 50*b*. The heights of the protruding portions 52 of the main face 50*a* are equal to each other on the main face 50*a* and the main face 50*b*. The cycle (pitch) of the uneven shape of the main face 50*a* is larger than the cycle (pitch) of the uneven shape of the main face 50*b*. The number of the protruding portions 52 (or the number of the depression portions 53) of the main face 50*a* per unit area when viewed from the opposing direction of the main faces 50*a* and 50*b* (Z direction) is smaller than the number of the protruding portions 52 (or the number of the depression portions 53) of the main face 50*b* per unit area.

Also in each of the ultrasonic devices 1C, 1D, and 1E, the main face 50*b* has the uneven shape in which the protruding portions 52 and the depression portions 53 are alternately continued, and is rougher than the main face 21*a*. Thus, an effect equal to that of the ultrasonic device 1 can be obtained. In each of the ultrasonic devices 1C, 1D, and 1E, the main face 50*a* also has an uneven shape rougher than that of the main face 21*a*. Thus, the ultrasonic components are diffusely reflected by the main face 50*a*. Accordingly, leakage of the ultrasonic components from the main face 50*a* to the outside is suppressed. As a result, it is possible to further reduce reverberation of the ultrasonic components. The depressions 55 corresponding to the shapes of the open cells 54 are also provided on the surfaces of the protruding portions 52 and the depression portions 53 of the main face 50*a*. Thus, the ultrasonic components are further diffusely reflected by the depressions 55. Since the main face 50*a* has the uneven shape, the space S3 is easily formed between the substrate 60 and the sound absorbing material 50.

In the ultrasonic device 1D, the main face 50*a* is rougher than the main face 50*b*. Thus, since the ultrasonic components are diffusely reflected by the main face 50*a* as compared with the case where the main face 50*a* is not rougher than the main face 50*b*, leakage of the ultrasonic components from the main face 50*a* to the outside is further suppressed.

In the ultrasonic device 1E, the main face 50*b* is rougher than the main face 50*a*. Thus, since the surface area of the main face 50*b* is increased as compared with the case where the main face 50*b* is not rougher than the main face 50*a*, it is possible to enhance the sound absorbing effect of the sound absorbing material 50.

Figure 14:
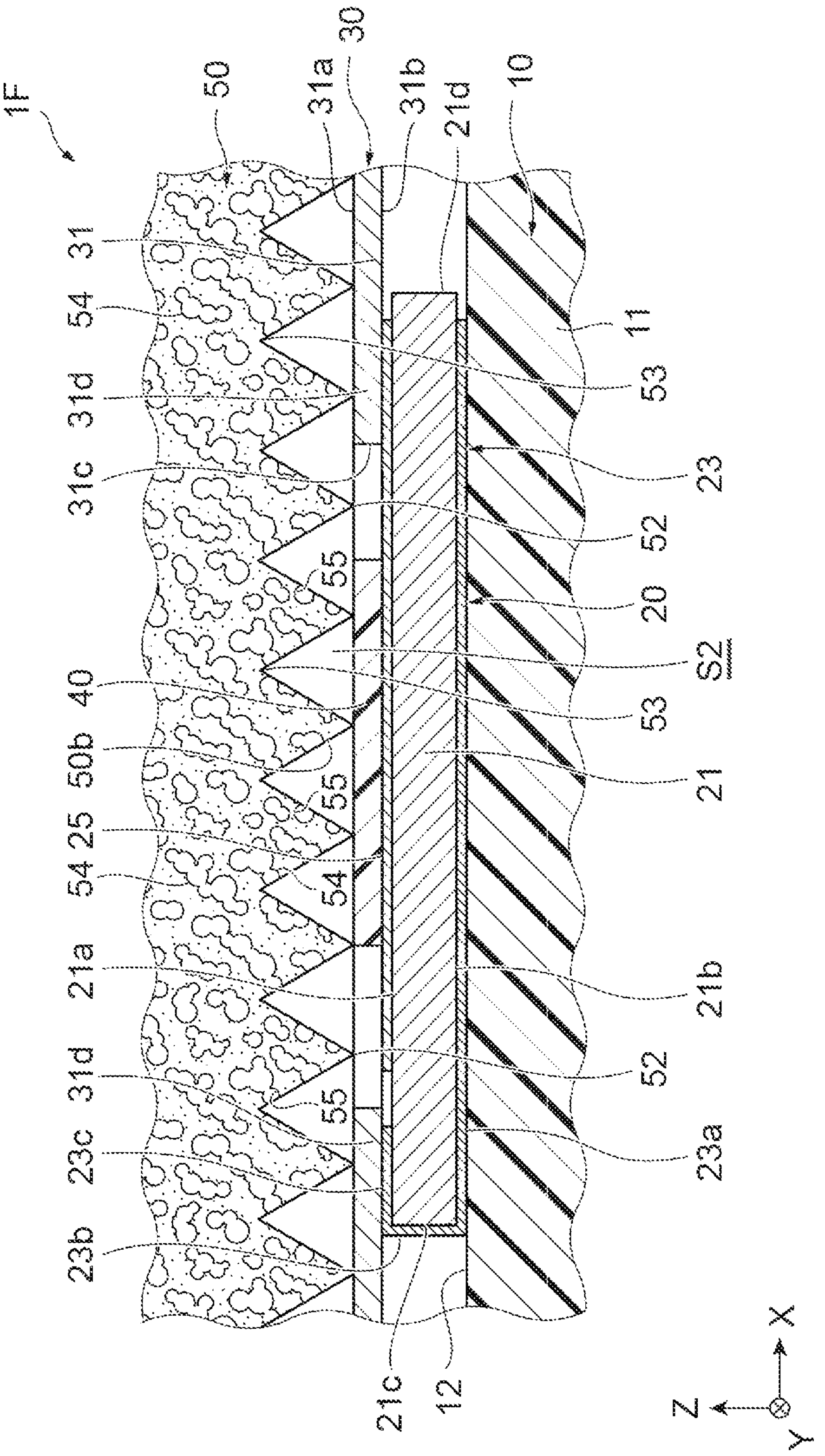
FIG. 14 is a partially enlarged cross-sectional view of an ultrasonic device according to a sixth modification.

FIG. 14 is a cross-sectional view of an ultrasonic device according to a sixth modification. As shown in FIG. 14, an ultrasonic device 1F is different from the ultrasonic device 1 (see FIG. 3) in that a damping material 40 is included. The damping material 40 is disposed on the piezoelectric element 20. The damping material 40 is disposed (applied) on the electrode 25. The damping material 40 is disposed in the opening 31*c* of the wiring member 30. The damping material 40 is separated from the wiring member 30 when viewed from the thickness direction of the piezoelectric element 20 (Z direction). The damping material 40 is not in contact with an inner face of the opening 31*c*. The thickness of the damping material 40 is equal to the thickness of the base 31 of the wiring member 30. The damping material 40 is, for example, an elastic body such as rubber. The sound absorbing material 50 is disposed in such a way that the protruding portions 52 of the main face 50*b* are in contact with the damping material 40 and the wiring member 30.

Also in the ultrasonic device 1F, the main face 50*b* has the uneven shape in which the protruding portions 52 and the depression portions 53 are alternately continued, and is rougher than the main face 21*a*. Thus, an effect equal to that of the ultrasonic device 1 can be obtained. Since the ultrasonic device 1F includes the damping material 40, reverberation of the ultrasonic components is further suppressed. Since the main face 50*b* has the uneven shape, although the protruding portions 52 are in contact with the damping material 40, the depression portions 53 and the depressions 55 of the main face 50*b* are kept in such a way as not to be in contact with the damping material 40. Thus, the sound absorbing effect of the sound absorbing material 50 is exerted. In this manner, it is possible to narrow the distance between the damping material 40 and the sound absorbing material 50 while securing the space S2 between the damping material 40 and the sound absorbing material 50, and to achieve space-saving.

The ultrasonic devices 1, 1A, 1B, 1C, 1D, 1E, and 1F may only transmit ultrasonic waves. The ultrasonic device 1 may only receive ultrasonic waves.

The piezoelectric element 20 may have one or a plurality of internal electrodes disposed in the piezoelectric element body 21. In this case, the piezoelectric element body 21 may have a plurality of piezoelectric layers, and the internal electrodes and the piezoelectric layers may be alternately disposed.

In the thickness direction of the piezoelectric element 20 (Z direction), the sound absorbing material 50 may be recessed to the side opposite to the piezoelectric element 20 from the vibration-proof material 70. The sound absorbing material 50 may be disposed in such a way that the tip ends of the protruding portions 52 of the main face 50*b* are positioned in the same plane as the tip end of the vibration-proof material 70 in the Z direction.

What is claimed is:

1. An ultrasonic device comprising:

a case defining a housing space;

a piezoelectric element disposed in the housing space;

a sound absorbing material disposed on a main face of the piezoelectric element and made of a foaming material; and a vibration-proof material disposed around the sound absorbing material, wherein the sound absorbing material includes a first opposing face opposed to the main face, and the first opposing face has an uneven shape in which a plurality of protruding portions and a plurality of depression portions are alternately continued, and is rougher than the main face.

2. The ultrasonic device according to claim 1, wherein a plurality of depressions is provided on surfaces of the plurality of protruding portions and the plurality of depression portions of the first opposing face.

3. The ultrasonic device according to claim 1, wherein a first space is formed between the piezoelectric element and the first opposing face.

4. The ultrasonic device according to claim 1, further comprising:

a substrate disposed in the housing space in such a way as to oppose to the piezoelectric element via the sound absorbing material and electrically connected to the piezoelectric element, wherein the sound absorbing material includes a second opposing face opposed to the substrate, and the second opposing face has an uneven shape in which a plurality of protruding portions and a plurality of depression portions are alternately continued, and is rougher than the main face.

5. The ultrasonic device according to claim 4, wherein a plurality of depressions is provided on surfaces of the plurality of protruding portions and the plurality of depression portions of the second opposing face.

6. The ultrasonic device according to claim 4, wherein a second space is formed between the substrate and the second opposing face.

7. The ultrasonic device according to claim 4, wherein the first opposing face is rougher than the second opposing face.

8. The ultrasonic device according to claim 1, further comprising a damping material disposed on the main face, wherein the sound absorbing material is disposed in such a way that the plurality of protruding portions of the first opposing face is in contact with the damping material.

9. The ultrasonic device according to claim 1, wherein the piezoelectric element is positioned inside an outer edge of the sound absorbing material when viewed from a thickness direction of the piezoelectric element.

10. The ultrasonic device according to claim 1, wherein the sound absorbing material protrudes toward the piezoelectric element from the vibration-proof material in a thickness direction of the piezoelectric element.

11. The ultrasonic device according to claim 1, wherein the first opposing face includes, when viewed from a thickness direction of the piezoelectric element, a first region positioned outside the piezoelectric element and a second region positioned inside the first region, and the second region is rougher than the first region.

12. The ultrasonic device according to claim 1, wherein the case includes a bottom wall on which the piezoelectric element is disposed, and the piezoelectric element is fixed to the bottom wall by bonding.

13. The ultrasonic device according to claim 1, wherein the piezoelectric element includes a plurality of electrodes disposed on the main face in such a way as to be separated from each other.

14. The ultrasonic device according to claim 1, wherein the sound absorbing material is made of a foaming material containing thermoplastic resin.

15. The ultrasonic device according to claim 1, wherein the vibration-proof material includes a lid body sealing an opening of the case.

16. The ultrasonic device according to claim 1, wherein the vibration-proof material is an elastic body.

17. The ultrasonic device according to claim 1, wherein the vibration-proof material has a density higher than a density of the sound absorbing material.

18. The ultrasonic device according to claim 1, further comprising:

a wiring member disposed on the piezoelectric element and electrically connected to the piezoelectric element, wherein the wiring member is a flexible printed circuit or a flexible flat cable.

19. The ultrasonic device according to claim 18, wherein the wiring member is bonded to the case with insulating resin.

20. The ultrasonic device according to claim 18, wherein the wiring member is formed with an opening for exposing a part of the piezoelectric element.

* * * * *